US008369436B2

(12) United States Patent
Stirling-Gallacher

(10) Patent No.: US 8,369,436 B2
(45) Date of Patent: Feb. 5, 2013

(54) MULTIPLE-INPUT MULTIPLE-OUTPUT SPATIAL MULTIPLEXING SYSTEM WITH DYNAMIC ANTENNA BEAM COMBINATION SELECTION CAPABILITY

(75) Inventor: Richard Stirling-Gallacher, Esslingen (DE)

(73) Assignee: Sony Deutschland GmbH, Berlin (DE)

( * ) Notice: Subject to any disclaimer, the term of this patent is extended or adjusted under 35 U.S.C. 154(b) by 1099 days.

(21) Appl. No.: 11/682,489

(22) Filed: Mar. 6, 2007

(65) Prior Publication Data
US 2007/0230639 A1    Oct. 4, 2007

(30) Foreign Application Priority Data

Mar. 30, 2006    (EP) ..................................... 06006737

(51) Int. Cl.
*H04B 7/02*    (2006.01)
*H04L 1/02*    (2006.01)
(52) U.S. Cl. ....................................... 375/267; 375/260
(58) Field of Classification Search .................. 375/260, 375/267
See application file for complete search history.

(56) References Cited

U.S. PATENT DOCUMENTS

| 5,565,873 | A |   | 10/1996 | Dean |
| 5,923,700 | A | * | 7/1999 | Zhang ............................ 375/141 |
| 6,067,048 | A | * | 5/2000 | Yamada ......................... 342/382 |
| 6,121,933 | A | * | 9/2000 | Cosenza et al. ........ 343/700 MS |
| 6,553,012 | B1 |   | 4/2003 | Katz |
| 7,084,811 | B1 | * | 8/2006 | Yap ............................... 342/375 |
| 7,233,283 | B2 | * | 6/2007 | Kikuchi ......................... 342/374 |
| 7,403,748 | B1 | * | 7/2008 | Keskitalo et al. ............. 455/101 |
| 2003/0022649 | A1 | * | 1/2003 | Voyer ........................... 455/277.1 |
| 2004/0056795 | A1 | * | 3/2004 | Ericson et al. ................ 342/354 |
| 2004/0066762 | A1 | * | 4/2004 | Alastalo ......................... 370/329 |
| 2004/0077379 | A1 |   | 4/2004 | Smith et al. |
| 2004/0095907 | A1 | * | 5/2004 | Agee et al. .................... 370/334 |
| 2004/0121810 | A1 | * | 6/2004 | Goransson et al. ......... 455/562.1 |
| 2004/0147290 | A1 | * | 7/2004 | Kikuchi ....................... 455/562.1 |
| 2005/0020310 | A1 |   | 1/2005 | Nakaya et al. |

(Continued)

FOREIGN PATENT DOCUMENTS

JP    10-190539    7/1998
JP    2004-328464    11/2004

(Continued)

OTHER PUBLICATIONS

Yuuta Nakaya, et al., "MIMO Receiver Using an RF-Adaptive Array Antenna with a Novel Control Method", IEEE Communications Society, 2004, pp. 2568-2572.

(Continued)

*Primary Examiner* — Erin File
(74) *Attorney, Agent, or Firm* — Oblon, Spivak, McClelland, Maier & Neustadt, L.L.P.

(57) ABSTRACT

A spatial diversity receiver for wirelessly receiving a modulated RF signal and a method for wirelessly transmitting and receiving the modulated RF signal. The spatial diversity receiver includes at least two antenna arrays and an antenna beam selection control unit. Each antenna array of the spatial diversity receiver includes at least two fixed beam antennas with distinct radiation patterns, and combinations of the fixed beam antennas are selectable for wireless receipt of the modulated RF signal. The antenna beam selection control unit is configured to control at least one antenna switching and/or combining unit in order to select a specific combination of fixed beam antennas from each antenna array.

7 Claims, 14 Drawing Sheets

U.S. PATENT DOCUMENTS

| | | | |
|---|---|---|---|
| 2005/0101352 A1* | 5/2005 | Logothetis et al. | 455/562.1 |
| 2005/0117675 A1* | 6/2005 | Das et al. | 375/343 |
| 2005/0157683 A1 | 7/2005 | Ylitalo et al. | |
| 2005/0221861 A1 | 10/2005 | Zeira | |
| 2005/0286650 A1* | 12/2005 | Han et al. | 375/267 |
| 2006/0131414 A1 | 6/2006 | Nakaya et al. | |

FOREIGN PATENT DOCUMENTS

| | | |
|---|---|---|
| JP | 2006-501786 | 1/2006 |
| WO | WO 2005/076841 A2 | 8/2005 |

OTHER PUBLICATIONS

Yuuta Nakaya, et al., "An RF-Adaptive Array Antenna Incorporated in a MIMO Receiver Under Interference", IEEE, 2004, 5 pages.

Y. Nakaya, et al., "Array and Diversity Gains of an RF-AAA Used on MIMO Receiver", Tokyo Institute of Technology, 2003, 5 pages.

Yuuta Nakaya, et al., "Incorporation of RF-Adaptive Array Antenna into MIMO Receivers", IEEE, 2003, 4 pages.

Jeng-Shiann Jiang, et al., "Enhancing Measured MIMO Capacity by Adapting the Locations of the Antenna Elements", School of Electrical and Computer Engineering Georgia Institute of Technology, IEEE, 2002, 6 pages.

F. Thudor, et al., "Low Cost, Multi-Beam Antenna for WLAN Applications", Thomson Multimedia, Corporate Research. 2002, 4 pages.

Japanese Office Action issued Apr. 24, 2012 in Japanese Application No. 2007-092360 with English translation, 5 pages.

U.S. Appl. No. 13/503,278, filed Apr. 20, 2012, Stirling-Gallacher, et al.

* cited by examiner (a) channel with
LOS component (b) channel with
no LOS component

MULTIPLE-INPUT MULTIPLE-OUTPUT SPATIAL MULTIPLEXING SYSTEM WITH DYNAMIC ANTENNA BEAM COMBINATION SELECTION CAPABILITY

FIELD AND BACKGROUND OF THE INVENTION

The present invention generally relates to the field of wireless communication systems. It particularly refers to a spatial diversity transmitter ad a spatial diversity receiver in a wireless communication system, as well as a corresponding method for wirelessly transmitting ad receiving modulated RF signals. The present invention is specifically advantageous but not exclusively limited to the application in a multiple-input multiple-output (MIMO) spatial multiplexing system and enables reception and transmission of said RF signals via multiple wireless signal propagation paths of a multipath fading channel in a way that correlation between the MIMO channel components are reduced and/or the signal to interference plus noise ratio (SINR) is increased. This results in an improved bit error rate (BER) or packet error rate (PER) performance of said wireless MIMO spatial multiplexing system.

Spatial diversity techniques have been shown to provide an effective means to combat multipath fading and to significantly mitigate co-channel interference in a wireless communication system. Nowadays, multiple-input multiple-output (MIMO) spatial multiplexing systems with a first antenna array consisting of $N \geq 2$ transmit (Tx) antennas on a wireless transmitter side and a second antenna array consisting of $M \geq 2$ receive (Rx) antennas on a wireless receiver side are becoming increasingly popular, which is owing to the fact that these systems provide an increased date rate R without the need for an increase in signal bandwidth B since the applied transmit antennas are able to transmit independent data streams. These independent data streams, however, interfere with each other such that a complex channel equalizer is required at the wireless receiver side in order to separate RF signals received via different signal propagation paths. Furthermore, to obtain optimum performance it is important that the different signal propagation paths between the transmit antennas of the antenna array on wireless transmitter side and receiver array on the wireless receiver array are uncorrelated with respect to each other. For handheld phone and portable terminals where only compact space diversity receivers can be used (and antenna elements are typically spaced by a distance of a fraction of the RF signal wavelength), the propagation paths become correlated and performance is degraded.

In conventional MIMO spatial multiplexing systems according to the prior art in which spatial antenna diversity is applied by using multiple-element antenna arrays with N omni-directional transmit antennas on a wireless transmitter side (each transmit antenna transmitting a different data symbol) and M omni-directional receive antennas on a wireless receiver side a maximum data transmission rate R can be achieved which is N times greater than the data transmission rate in an equivalent non-MIMO wireless communication system.

The system behavior of a MIMO spatial multiplexing system can be described by the matrix-vector equation $$\underline{R}(f,t_0) = \underline{H}(f,t_0) \cdot \underline{S}(f) + \underline{N}(f) [\sqrt{W} \cdot Hz^{-1}] \quad (1a)$$

with $\underline{R}(f,t_0) := [R_1(f,t_0), \ldots, R_m(f,t_0), R_M(f,t_0)]^T \in C^M$ being an M-dimensional vector representing the obtained RF signals $\{R_m(f,t_0)\}_{m \in \{1, \ldots, M\}}$ at the input ports of a spatial diversity receiver's M demodulator stages at $t=t_0$, $\underline{S}(f) := [S_1(f), \ldots, S_n(f), \ldots, S_N(f)]^T \in C^N$ being an N-dimensional vector representing the signal spectra $\{S_n(f)\}_{n \in \{1, \ldots, N\}}$ of the particular RF signals $\{s_n(t)\}_{n \in \{1, \ldots, N\}}$ to be transmitted by N antenna elements of a spatial diversity transmitter's antenna array (on the assumption that $S_n(f) \equiv S(f) \forall n \in \{1, 2, 3, \ldots, N\}$, wherein $S(f)$ denotes the corresponding signal spectrum of an information-carrying modulated RF signal $s(t)$ to be transmitted) and $\underline{N}(f) := [N_1(f), \ldots, N_m(f), \ldots, N_M(f)]^T \in C^M$ being an M-dimensional vector representing additive white Gaussian noise components $\{N_m(f)\}_{m \in \{1, \ldots, M\}}$ at $t=t_0$. In this equation, the multipath propagation channel transfer function at observation time $t=t_0$ is given in a matrix form $$\underline{H}(f,t_0) := \begin{pmatrix} H_{11}(f,t_0) & \cdots & H_{1n}(f,t_0) & \cdots & H_{1N}(f,t_0) \\ \vdots & \ddots & \vdots & \cdots & \vdots \\ H_{m1}(f,t_0) & \cdots & H_{mn}(f,t_0) & \cdots & H_{mN}(f,t_0) \\ \vdots & \cdots & \vdots & \ddots & \vdots \\ H_{M1}(f,t_0) & \cdots & H_{Mn}(f,t_0) & \cdots & H_{MN}(f,t_0) \end{pmatrix} \in C^{M \times N} \quad (1b)$$

with $$H_{mn}(f,t_0) = \text{Re}\{H_{mn}(f,t_0)\} + j \cdot \text{Im}\{H_{mn}(f,t_0)\} \quad (1c)$$
$$= |H_{mn}(f,t_0)| \cdot e^{j \cdot \angle H_{mn}(f,t_0)} \forall m \in \{1, \ldots, M\}, n \in \{1, \ldots, N\},$$

wherein $\{H_{mn}(f,t_0)\}_{m \in \{1, \ldots, M\}, n \in \{1, \ldots, N\}}$ denote the $L = M \cdot N$ complex-valued channel transfer functions for the L strongest signal propagation paths between the N transmit antenna elements of said spatial diversity transmitter and the M receive antenna elements of said spatial diversity receiver in the above-described wireless MIMO spatial multiplexing system at $t=t_0$, $|H_{mn}(f,t_0)|$ and $\angle H_{mn}(f,t_0)$ denote the corresponding frequency response and phase response of channel transfer function $H_{mn}(f,t_0)$ at $t=t_0$, respectively, and $j := \sqrt{-1}$ is the imaginary unit.

BRIEF DESCRIPTION OF THE PRIOR ART

From the prior art, various systems and methods are known to improve the BER performance of MIMO wireless communication systems by using adaptive antennas. In the articles "Incorporation of RF-Adaptive Array Antenna into MIMO Receivers" (2003 IEEE Conference on Tropical Wireless Communication Technology (TWCT), Hawaii 2003), "Array and Diversity Gains of an Rx-AAA used on MIMO Receiver" (WPMC 03, Yokusuka, Japan, 2003), "An RF adaptive Array Antenna Incorporated in a MIMO Receiver under Interference" (IEEE Vehicular Technology Conference 2004, pp. 4043) and "MIMO Receiver using an RF-Adaptive Array Antenna with a Novel Control Method" (IEEE Conference on Communications, Jun. 20-24, 2004, pp. 2568-2572) by Y. Nakaya et al. a MIMO wireless communications system is described in which an antenna array consisting of a number of omni-directional elements is used at a MIMO spatial diversity receiver. This adaptive antenna is referred to as a RF-adaptive array antenna (RF-AAA). The elements of the RF-AAA are phase-shifted, weighted and then subsequently combined at the carrier frequency used by the MIMO spatial diversity receiver, such that each spatial diversity receiver component of the MIMO spatial diversity receiver uses a different RF-AAA. By using different phase shifts for the different elements, the radiation pattern of the RF-AAA can be concentrated in different directions. A 4-bit phase shifter providing a 360°/2⁴=22.5° angular resolution in azimuth is described in these articles. By utilizing such an approach, the directivity of the resulting beam for the RF-AAA of each spatial diversity receiver component is controlled in order to maximize the signal-to-interference-plus-noise ratios obtained at the respective spatial diversity receiver component. In this way, the main lobe of the radiation pattern is steered in the direction of the wanted signal and a null lobe is steered in the direction of interferers. A more detailed description of this beam-steering algorithm can be found in the above-cited articles. These approaches have shown to yield a good performance gain in presence of an in-band interferer and also a capacity improvement when no interferer is present. However, performance gain is reduced when the angular spread of the interference is large and when the MIMO radio channel is correlated. The main reason for this reduction in performance gain is due to the fact that only the center angle of the beam for the wanted lobe and the null lobe can be changed. The beam width can not be changed. Furthermore, there is no criterion for controlling the separate RF-AAA when the spatial diversity receiver channels are correlated.

In their article "Enhancing Measured MIMO Capacity by Adapting the Location of the Antenna Elements" (IEEE PIMRC Conference September 2002) the authors J. Shian and M. A. Ingram describe a MIMO wireless communication system in which the spatial distances between multiple receive antennas on a receiver side of said MIMO wireless communication system are changed so as to maximize transmission capacity.

In their article "Low-Cost, Multi-Beam Steering Antenna for WLAN Applications" (International Symposium on Antennas, 2002, Nice, France) the authors F. Thudor and A. Louzir describe a set of 90° fixed beam antennas for a wireless local area network (WLAN) application that is applied to improve the BER performance. To improve performance one of these fixed beam antennas is selected.

OBJECT OF THE PRESENT INVENTION

In view of the above-described prior art, it is the object of the present invention to propose a spatial diversity transmitter and a spatial diversity receiver for a wireless multiple-input multiple-output (MIMO) spatial multiplexing system with an improved BER or PER performance.

This object is achieved by the present invention as defined in the independent claims. Advantageous features of the invention are defined in the subordinate claims.

SUMMARY OF THE INVENTION

The present invention is basically directed to a spatial diversity receiver for wirelessly receiving a modulated RF signal s(t). The spatial diversity receiver comprises at least two antenna arrays, wherein each of said antenna arrays is equipped with at least two fixed beam antennas with distinct radiation patterns, which means that said radiation patterns differ from each other in their azimuthal and/or elevational characteristics. These fixed beam antennas are selectable for wireless receipt of the modulated RF signal s(t). According to the invention, said spatial diversity receiver may comprise an antenna beam selection control means adapted for controlling at least one antenna switching and/or combining means in order to select a specific combination of said fixed beam antennas from each antenna array. The selection of said specific combination of fixed beam antennas may be based on estimated values of the channel impulse responses of different wireless signal propagation paths $P_l$ between a wireless transmitter and said spatial diversity receiver.

According to a further aspect of the invention, each antenna array is connected to an antenna switching and/or combining means for selecting specific combinations of said fixed beam antennas that is placed in a receiver branch assigned to said antenna array and directly pre-connected to a down-conversion stage of said receiver branch.

Said antenna beam selection control means can e.g. be configured for selecting a specific antenna beam combination so as to maximize the average signal-to-interference-plus-noise ratios $\bar{\gamma}_l$, (SINRs) of RF signals received via said wireless signal propagation paths $P_l$ and/or to minimize the correlation coefficients of different pairs of said RF signals.

According to the invention, each fixed beam antenna of said antenna arrays has a distinct radiation pattern with a different beam center and/or beam width in the azimuth and/or elevation plane, wherein a superposition of all these radiation patterns may cover all possible azimuthal ($\phi$) and/or elevational angles of arrival ($\theta$) from which an RF signal s(t) is likely to be received.

For example, each antenna array of said spatial diversity receiver may comprise $N_A=4$ fixed beam antennas having different radiation patterns with main lobes in the azimuth plane which are steered to azimuthal directions $$\phi_{kml1}, \phi_{kml2}, \ldots, \phi_{kmlN_A}[\text{rad}] \in \{\pi/N_A + k_{ml} \cdot 2\pi/N_A | k_{ml} \in \{0, 1, 2, \ldots, N_A-1\}\} \qquad (2)$$

In this connection, it should explicitly be mentioned that the number of fixed beam antennas of the receiver-resident antenna arrays is not limited to four, which means that number $N_A$ may take any integer value greater or equal than two.

Furthermore, the spatial diversity receiver may be equipped with a channel estimation and/or equalization circuitry for compensating detected multipath fades in the channel amplitude response of at least one wireless signal propagation path $P_l$ between a wireless transmitter and the spatial diversity receiver.

According to a further aspect of the invention, said receiver is adapted to receive said modulated RF signal in a MIMO (multiple input multiple output) system, or may be part of such a MIMO system.

The present invention is further directed to a spatial diversity transmitter for wirelessly transmitting a modulated RF signal s(t). The spatial diversity transmitter comprises at least two antenna arrays, wherein each antenna array is equipped with at least two fixed beam antennas with distinct radiation patterns, which means that said radiation patterns differ from each other in their azimuthal and/or elevational characteristics. Said fixed beam antennas are selectable for wireless transmission of the modulated RF signal s(t). According to the invention, said spatial diversity transmitter may comprise an antenna beam selection control means adapted for controlling at least one antenna switching and/or combining means in order to select a specific combination of fixed beam antennas from each antenna array. The selection of said specific combination of fixed beam antennas may be based on estimated values of the channel impulse responses of different wireless signal propagation paths $P_l$ between the spatial diversity transmitter and a wireless receiver.

According to a further aspect of the invention, each antenna array is connected to an antenna switching and/or combining means for selecting specific combinations of said fixed beam antennas which is placed in a transmitter branch assigned to said antenna array and directly post-connected to an up-conversion stage of said transmitter branch.

Said antenna beam selection control means can e.g. be configured for selecting a specific antenna beam combination so as to maximize the average signal-to-interference-plus-noise ratios $\bar{\gamma}_l$ (SINRs) of RF signals transmitted via said wireless signal propagation paths $P_l$ and/or to minimize the correlation coefficients of different pairs of these RF signals.

Again, each fixed beam antenna of said antenna arrays has a distinct radiation pattern with a different beam center and/or beam width in the azimuth and/or elevation plane, wherein a superposition of all these radiation patterns may cover all possible azimuthal ($\phi$) and/or elevational angles of departure ($\theta$) from which RF signal s(t) is required to be transmitted. For example, each antenna array of the spatial diversity receiver comprises $N_A=4$ fixed beam antennas having different radiation patterns with main lobes in the azimuth plane steered to azimuthal directions $\phi_{kml1}, \phi_{kml2}, \ldots, \phi_{kml, N_A}$ as discussed with reference to the spatial diversity receiver. In this connection, it should be mentioned that the number of fixed beam antennas of the transmitter-resident antenna arrays is not limited to four, which means that number $N_A$ may take any integer value greater or equal than two.

Furthermore, the spatial diversity transmitter may receive channel estimation information from the receiver via a feedback channel, so that it can select the most suitable combination of fixed beam antennas for optimum performance. According to a further aspect of the invention, said transmitter is adapted to transmit said modulated RF signal in a MEMO system, or may be part of such a MIMO system. Such a MIMO system may include a receiver according to the present invention as well as a transmitter according to the present invention.

The transmitter and the receiver of the present invention can be implemented in any kind of electronic equipment adapted for transmitting and receiving, respectively, of modulated RF signals. Hereby, the transmitter and the receiver of the present invention can be implemented in the same electronic equipment. Such electronic equipments may comprise large or small portable devices and terminals, e.g. but not limited to handheld phones, personal digital assistants and so forth.

The present invention is further directed to a method for wirelessly transmitting and receiving a modulated RF signal s(t) via multiple wireless signal propagation paths between a spatial diversity transmitter and a spatial diversity receiver, said spatial diversity transmitter having at least two antennas for wirelessly transmitting said modulated RF signal s(t) to the spatial diversity receiver and the spatial diversity receiver having at least two antenna arrays, wherein each antenna array comprises a number $N_A$ of fixed beam antennas with distinct radiation patterns, which means that said radiation patterns differ from each other in their azimuthal and/or elevational characteristics. According to the present invention, said method is characterized by the steps of estimating the channel impulse responses for each wireless signal propagation path $P_l$, selecting a specific combination of fixed beam antennas from each antenna array based on estimated values of the aforementioned channel impulse responses for said wireless signal propagation paths $P_l$ and receiving said RF signal by the selected combination of fixed beam antennas.

According to the invention, said method is characterized by the steps of maximizing the average signal-to-interference-plus-noise ratios $\bar{\gamma}_l$ (SINRs) of RF signals received via each signal propagation path $P_l$ and/or minimizing the correlation coefficient indicating the correlation between RF signals received via different signal propagation paths. In a more specific wireless communication scenario, RF signals are only received via a predefined number of the strongest signal propagation paths $P_l$ by the selected combination of fixed beam antennas.

According to a further aspect of the present invention, in said method of the present invention said receiver is adapted to receive said modulated RF signal in a MIMO system and said transmitter is adapted to transmit said modulated RF signal in said MIMO system.

Finally, the present invention is directed to a software program product being specially configured for performing a method as described above when being executed by antenna beam selection control means of a spatial diversity transmitter and/or a spatial diversity receiver.

BRIEF DESCRIPTION OF THE DRAWINGS

FIG. 1 shows a block diagram of an OFDM-based wireless MIMO spatial multiplexing system with N=2 transmit antennas 107a and 107b on a wireless transmitter side 110 and M=2 receive antennas 121a and 121b on a wireless receiver side 120, wherein the transmit antennas 107a+b and/or the receive antennas 121a+b may e.g. be realized as fixed beam antennas. The achievable data transmission rate R is therefore two times higher than in a non-MIMO wireless communication system. In this connection, it should be mentioned that said number of transmit antennas and said number of receive antennas is not limited to two antennas on each side, which means that said numbers N and M may take any integer value greater or equal than two. An incoming digital data stream of a baseband input signal to be transmitted is first fed to a channel encoder 101 before being split by means of a spatial splitter 102 and supplied to the input ports of two distinct transmitter branches used for generating the corresponding RF signal of said baseband input signal and transmitting it via two spatially separated fixed beam antennas 107a+b. After being submitted to an interleaver followed by a bit-to-symbol mapper 103a (or 103b, respectively), the data is transformed into a multi-level signal so as to be prepared for OFDM modulation. For this purpose, the serial data stream is converted to parallel by means of a serial-to-parallel converter (not shown). The data symbols are then mapped to the available subcarriers of the OFDM-based MIMO system by using an Inverse Fast Fourier Transform (IFFT) performed by a digital signal processor 104a (or 104b, respectively) and reconverted to serial by means of a parallel-to-serial converter (not shown). After OFDM modulation a guard interval is inserted with the aid of a guard interval insertion unit (not shown). The resulting signal is then submitted to a digital-to-analog converter 105a (or 105b, respectively) and supplied to a band-pass filter so as to reduce out-of-band radiation. Thereby, a raised-cosine window function can e.g. be used. The analog baseband signal is then up-converted to an RF band with the aid of an RF up-conversion unit 106a (or 106b, respectively), amplified by means of an integrated power amplifier (PA) of said RF up-conversion unit and transmitted over the mobile radio channel.

Figure 1:
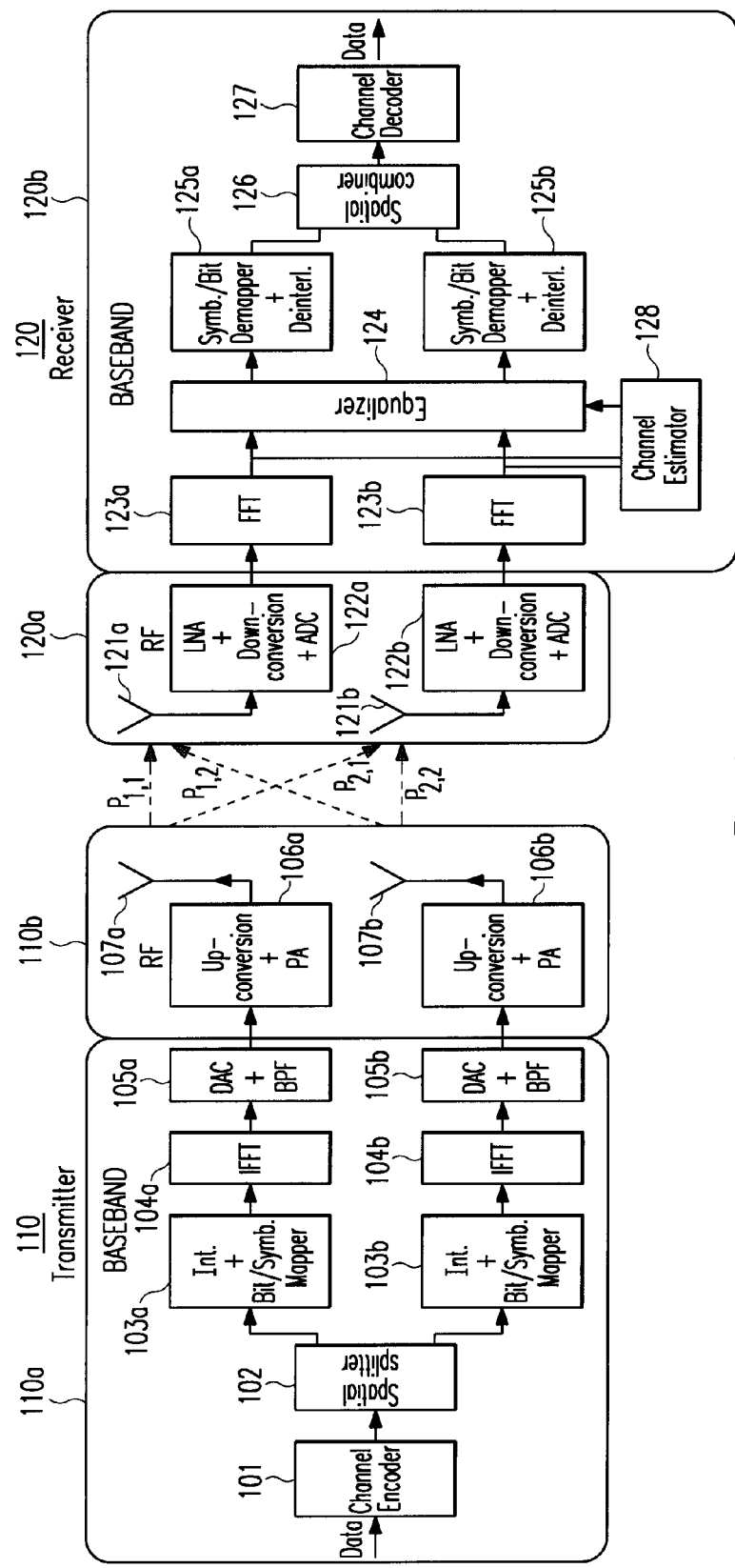
FIG. 1 shows an example of a conventional wireless OFDM-based 2×2 MIMO spatial multiplexing system according to the prior art, FIG. 2 a more detailed view of the spatial diversity receiver in the wireless OFDM-based 2×2 MIMO spatial multiplexing system depicted in FIG. 1, wherein an antenna array consisting of $N_A=4$ fixed beam antennas for generating different antenna radiation patterns representing an antenna beam with up to four main lobes radiating in four preferred azimuthal directions $\phi_{kml1}$ is applied in each receiver branch.

On the wireless receiver side 120 a complementary procedure is performed in reverse order in two distinct receiver branches. First, an R signal received by receive antenna 121a (or 121b, respectively) is amplified by a low-noise amplifier (LNA), down-converted to the baseband by means of an RF down-conversion unit 122a (or 122b, respectively) and submitted to an analog-to-digital converter (not shown). After the guard interval has been removed by means of a guard interval removal unit (not shown), an OFDM demodulation is performed. The obtained baseband signal is thereby transformed into a multi-level signal to be prepared for OFDM demodulation. After the serial data stream has been converted to parallel by means of a serial-to-parallel converter (not shown), a Fast Fourier Transform (FFT) is performed$_{[R1]}$ 123a (or 123b, respectively), and the obtained data are reconverted to serial by means of a parallel-to-serial converter (also not shown). A channel estimation and/or equalization circuitry (124 and 128) is used for compensating detected multipath fades in the channel amplitude responses $|H_l(f, t)|$ of the propagation paths $P_l$ between the wireless transmitter side 110 and the wireless receiver side 120. After the channel equalization the resulting data stream is submitted to a symbol-to-bit demapper 125a (or 125b, respectively) followed by a deinterleaver before the output signals of said two receiver branches are combined by means of a spatial combiner 126. Finally, the combined data stream is fed to a channel decoder 127 for being decoded.

It is well known that for OFDM systems such a combination leads to a channel transfer $\underline{H}_k(f, t_0)$ function matrix (see equation 1b) which contains single value complex coefficients. Furthermore by assuming without loss of generality that the channel does not change with time over one sent symbol duration, the to variable can be removed. Additionally for OFDM systems since each carrier occupies a different frequency $f$, the variables $f$ can be replaced by the carrier index number k (k=1, ..., K where K is the total number of subcarriers). By using the standard mathematical notation that variables in lower case bold denote vectors and that variables in upper case bold denote matrices, the system behavior of this example wireless MIMO OFDM spatial multiplexing system can be described by a set of K matrix-vector equations $$r_k = H_k s_k + n_k \forall k \in \{1, 2, \ldots, K\} \quad (3a)$$

Where $r_k := [r_{1,k}, \ldots, r_{m,k}, \ldots, r_{M,k}]$ is a M×1 vector representing the received RF signal, $s_k := [s_{1,k}, \ldots, s_{n,k}, \ldots, s_{N,k}]$ is a N×1 vector representing the sent signal and $n_k := [n_{1,k}, \ldots, s_{m,k}, \ldots, s_{M,k}]$ is a M×1 vector representing the additive white Gaussian noise components. In this equation the channel transfer $H_k$ is given for each $k \in \{1, 2, \ldots, K\}$ in a matrix form $$H_k := \begin{pmatrix} H_{11,k} & \cdots & H_{1n,k} & \cdots & H_{1N,k} \\ \vdots & \ddots & \vdots & \cdots & \vdots \\ H_{m1,k} & \cdots & H_{mn,k} & \cdots & H_{mN,k} \\ \vdots & \cdots & \vdots & \ddots & \vdots \\ H_{M1,k} & \cdots & H_{Mn,k} & \cdots & H_{MN,k} \end{pmatrix} \in C^{M \times N} \text{ with} \quad (3b)$$

$$H_{mn,k} = \text{Re}\{H_{mn,k}\} + j \cdot \text{Im}\{H_{mn,k}\} \quad (3c)$$
$$= |H_{mn,k}| \cdot e^{j \cdot \angle H_{mn,k}} \forall m \in \{1, \ldots, M\},$$
$$n \in \{1, \ldots, N\} \text{ and } k \in \{1, \ldots, K\},$$

wherein $\{H_{mn,k}\}_{m \in \{1, \ldots, M\}, n \in \{1, \ldots, N\}}$ denote the L=M·N complex-valued channel transfer functions between the N transmit antenna elements of said spatial diversity transmitter and the M receive antenna elements of said spatial diversity receiver in the above-described wireless MIMO spatial multiplexing system for subcarrier k, $|H_{mn,k}|$ and $\phi H_{mn,k}$ denote the corresponding frequency response and phase response of channel transfer function $H_{mn,k}$ respectively, and $j := \sqrt{-1}$ is the imaginary unit.

Each row element of vector $r_k$ denotes the received baseband signal component at the output port of the first and second FFT stages 123a and 123b comprised in the baseband part of spatial diversity receiver 120 from the OFDM-based 2×2 MIMO spatial multiplexing system as depicted in FIG. 1, respectively, wherein said part is received on the k-th subcarrier of the OFDM transmission system. Analogously, each row element of vector $s_k$ denotes the baseband transmitted signal component which is fed to the input port of the first and second IFFT stages 104a or 104b comprised in the baseband part of spatial diversity transmitter 110 from this OFDM-based 2×2 MIMO spatial multiplexing system, respectively, wherein said part shall be transmitted on the k-th subcarrier of this OFDM transmission system. For the OFDM-based 2×2 MIMO spatial multiplexing system as depicted in FIG. 1 with two transmit (Tx) antennas (N=2) and two receive (Rx) antennas (M=2), the baseband signal component received on subcarrier k can be written as $$\underbrace{\begin{pmatrix} r_{1,k} \\ r_{2,k} \end{pmatrix}}_{=r_k} = \underbrace{\begin{pmatrix} h_{11,k} & h_{12,k} \\ h_{21,k} & h_{22,k} \end{pmatrix}}_{=H_k} \cdot \underbrace{\begin{pmatrix} s_{1,k} \\ s_{2,k} \end{pmatrix}}_{=s_k} + \underbrace{\begin{pmatrix} n_{1,k} \\ n_{2,k} \end{pmatrix}}_{=n_k}, \quad (3d)$$

that applies for each $k \in \{1, \ldots, K\}$. As can be seen from equation (3d), the received baseband signals $r_{1,k}$ and $r_{2,k}$ in the upper or lower branch of the spatial diversity receiver 120 as depicted in FIG. 1, respectively. The received baseband signals are therefore a linear combination of the transmitted signal sent signals $s_{1,k}$ and $s_{2,k}$ with the additional additive white Gaussian noise (AWGN) $n_{1,k}$ and $n_{2,k}$, components. The sent signals therefore interfere with each other. In order to form estimates of the sent signals $s_{1,k}$ and $s_{2,k}$ from the received signals $r_{1,k}$ and $r_{2,k}$ n the presence of the additive white Gaussian noise, an equalizer is needed on the receiver side. For realizing said equalizer, various adaptive algorithms can be applied, e.g. algorithms which are based on zero forcing (ZF), Minimum Mean Square Error (MMSE), Maximum Likelihood detection (MLD), sphere detection (SD) or interference cancellation (IC) techniques, respectively, or any combination thereof.

For optimizing the BER performance of a wireless MIMO spatial multiplexing system and for increasing the efficiency of an applied equalizer on the receiver side, two criteria should be fulfilled:

1. The correlations of the channel impulse responses $\{h_{mn,k}\}_{m \in \{1, \ldots, M\}, n \in \{1, \ldots, N\}}$ corresponding to the particular channel transfer functions $\{H_{mn,k}\}_{m \in \{1, \ldots, M\}, n \in \{1, \ldots, N\}}$ from said channel transfer matrix $H_k$ should be minimal. For the OFDM-based 2×2 MIMO spatial multiplexing system as depicted in FIG. 1 this means that the cross-correlation functions between different pairs of said channel impulse responses $h_{1,k}$ and $h_{2,k}$ with $h_{1,k}$ being a representative from a set $\{h_{mn,k}\}_{m \in \{1, \ldots, M\}, n \in \{1, \ldots, N\}}$ of different channel impulse responses between the N=2 transmit antenna elements 107a+b of spatial diversity transmitter 110 and the M=2 receive antenna elements 121a+b of spatial diversity receiver 120 in the above-described wireless MIMO spatial multiplexing system for subcarrier k and $h_{2,k} \neq h_{1,k}$ being a further representative from said set of channel transfer functions for subcarrier k should take minimal values.

2. The signal-to-interference-plus noise ratios (SINRs) of the received baseband signal spectra should be as high as possible. For the OFDM-based 2×2 MIMO spatial multiplexing system depicted in FIG. 1 this means that, assuming that the signal powers of the two transmitted signal spectra $s_{1,k}$ and $s_{2,k}$ are normalized to unity, the average SINRs for one OFDM symbol over K subcarriers of the received baseband signals $r_{1,k}$ and $r_{2,k}$ in the upper (m=1) or lower branch (m=2) of the spatial diversity receiver 120 as depicted in FIG. 1, respectively, can be expressed as follows:

$$\bar{\gamma}_1 = 10 \cdot \log_{10}\left(\frac{\overline{P_{h_{11}}} + \overline{P_{h_{12}}}}{\sigma_n^2 + \overline{P_I}}\right) \text{ [dB]} \quad (4a)$$

and $$\bar{\gamma}_2 = 10 \cdot \log_{10}\left(\frac{\overline{P_{h_{21}}} + \overline{P_{h_{22}}}}{\sigma_n^2 + \overline{P_I}}\right) \text{ [dB]} \quad (4b)$$

with $$\overline{P_{h_{11}}} = E\{|h_{11}|^2\} = \frac{1}{K}\sum_{k=1}^{K}|h_{11,k}|^2 \ [W], \quad (5a)$$

$$\overline{P_{h_{12}}} = E\{|h_{12}|^2\} = \frac{1}{K}\sum_{k=1}^{K}|h_{12,k}|^2 \ [W], \quad (5b)$$

$$\overline{P_{h_{21}}} = E\{|h_{21}|^2\} = \frac{1}{K}\sum_{k=1}^{K}|h_{21,k}|^2 \ [W] \quad (5c)$$

and $$\overline{P_{h_{22}}} = E\{|h_{22}|^2\} = \frac{1}{K}\sum_{k=1}^{K}|h_{22,k}|^2 \ [W], \quad (5d)$$

wherein $\sigma_n^2 \equiv \text{Var}\{n(t)\} = E\{[n(t)-E\{n(t)\}]^2\} = E\{n^2(t)\} - E^2\{n(t)\}$ (in W) denotes the variance of an additive white Gaussian noise n(t) which is superimposed to the transmitted RF signals $s_1$ and $s_2$ and $$\overline{P_I} = E\{s_I^2\} = \frac{1}{K}\sum_{k=1}^{K}s_{I,k}^2 \ [W] \quad (5e)$$

is the power of an interfering signal $s_I$ averaged over K subcarriers. Thereby, it is important to note that the aforementioned interfering signal $s_I$ may e.g. originate from a further spatial diversity transmitter (not shown) or any other device (e.g. a microwave oven, etc.) that generates an electromagnetic signal having spectral components at the same frequencies as the signal spectra $s_{1,k}$ and/or $s_{2,k}$ of the RF signals transmitted by the upper or the lower transmitter branch of spatial diversity transmitter 110 in the OFDM-based 2×2 MIMO spatial multiplexing system. It should also be noted that any other measures of average signal-to-interference-plus-noise ratios $\bar{\gamma}_1$ and $\bar{\gamma}_2$ are also possible.

In order to fulfill both of these criteria, a new type of adaptive antenna is proposed that can advantageously be applied on the receiver side and/or on the transmitter side. Although the central idea underlying the present invention is described below with regard to spatial diversity receiver 120, the concept of using this new type of adaptive antenna can also be applied to the spatial diversity transmitter 110.

Figure 2:
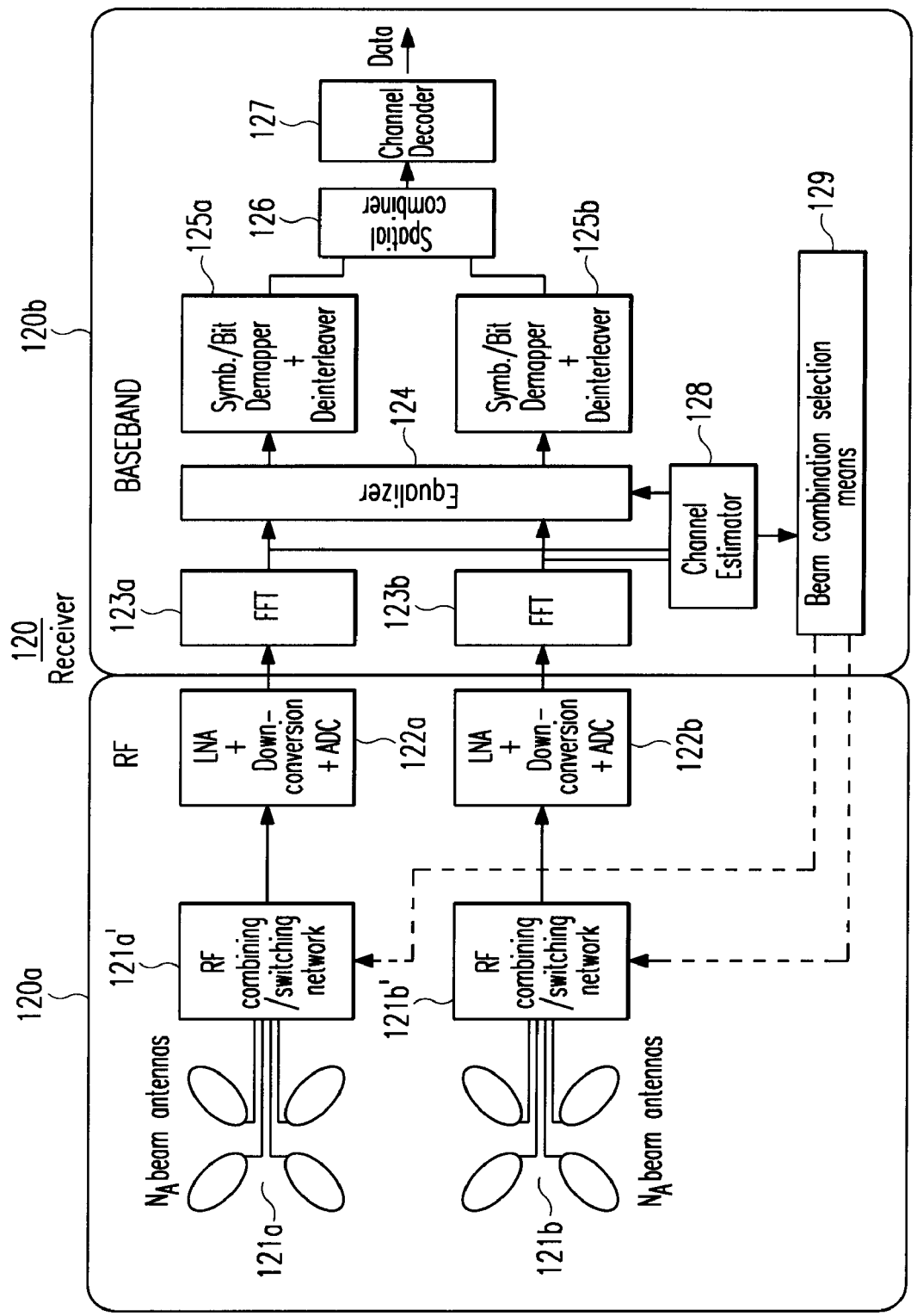
Figure 3:
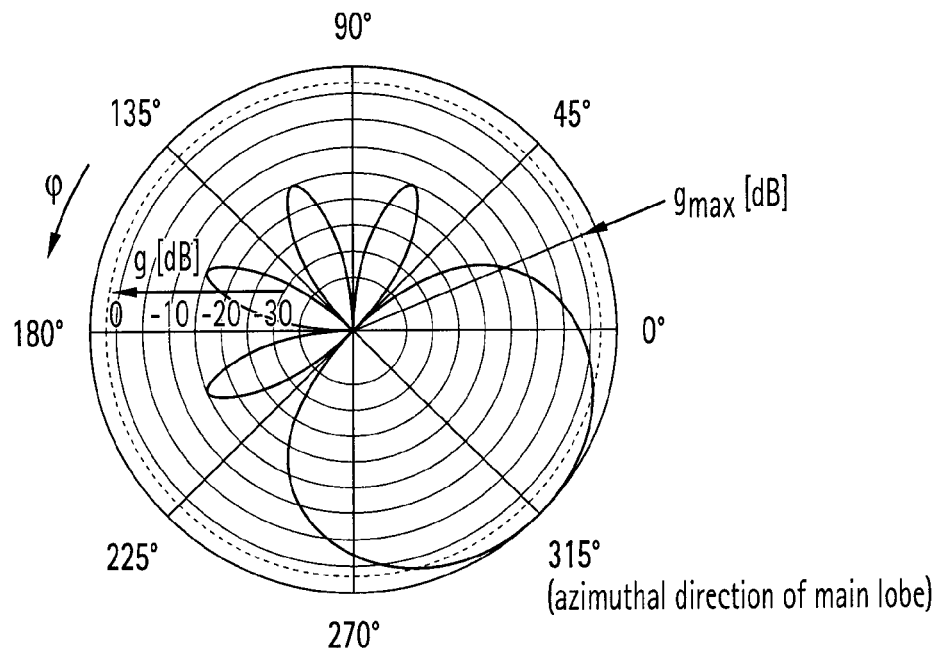
FIG. 3 shows an example of an azimuthal radiation pattern having a main lobe at azimuthal direction $\phi=7\pi/4$ rad for a first fixed beam antenna of a transmitter or receiver-resident antenna array consisting of $N_A=4$ fixed beam antennas.
Figure 4:
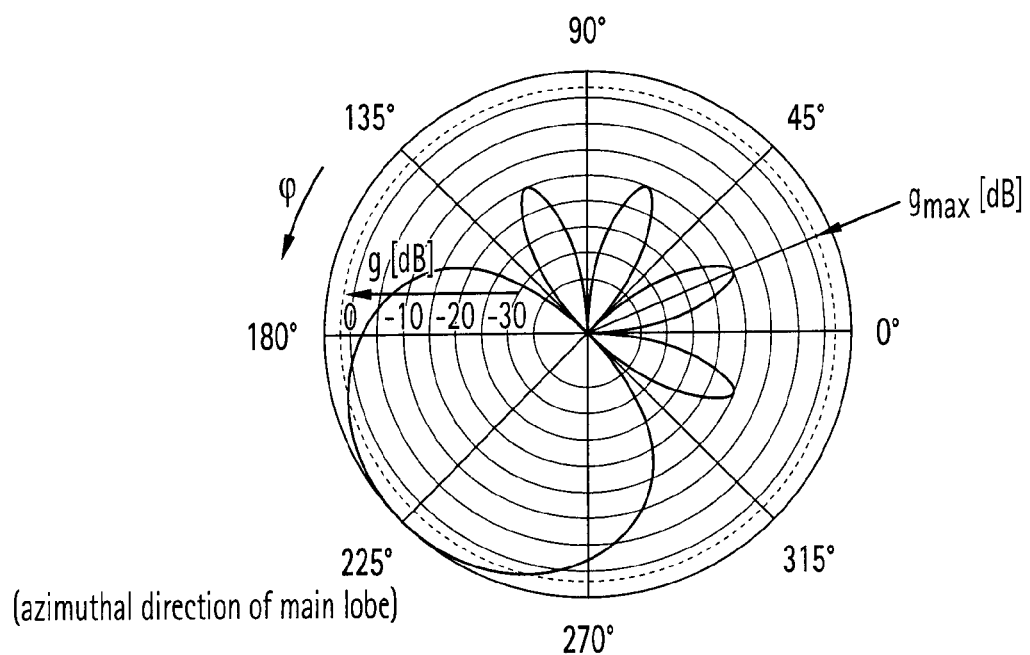
FIG. 4 shows an example of an azimuthal radiation pattern having a main lobe at azimuthal direction $\phi=5\pi/4$ rad for a second fixed beam antenna of said transmitter- or receiver-resident antenna array consisting of $N_A=4$ fixed beam antennas.
Figure 5:
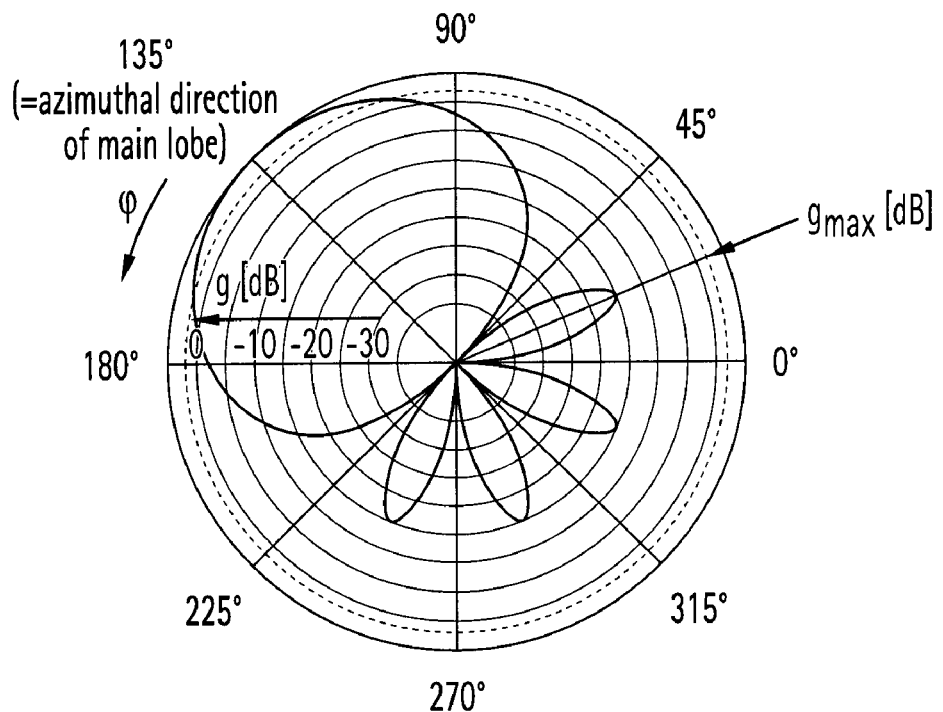
FIG. 5 shows an example of an azimuthal radiation pattern having a main lobe at azimuthal direction $\phi=3\pi/4$ rad for a third fixed beam antenna of said transmitter- or receiver-resident antenna array consisting of $N_A=4$ fixed beam antennas.
Figure 6:
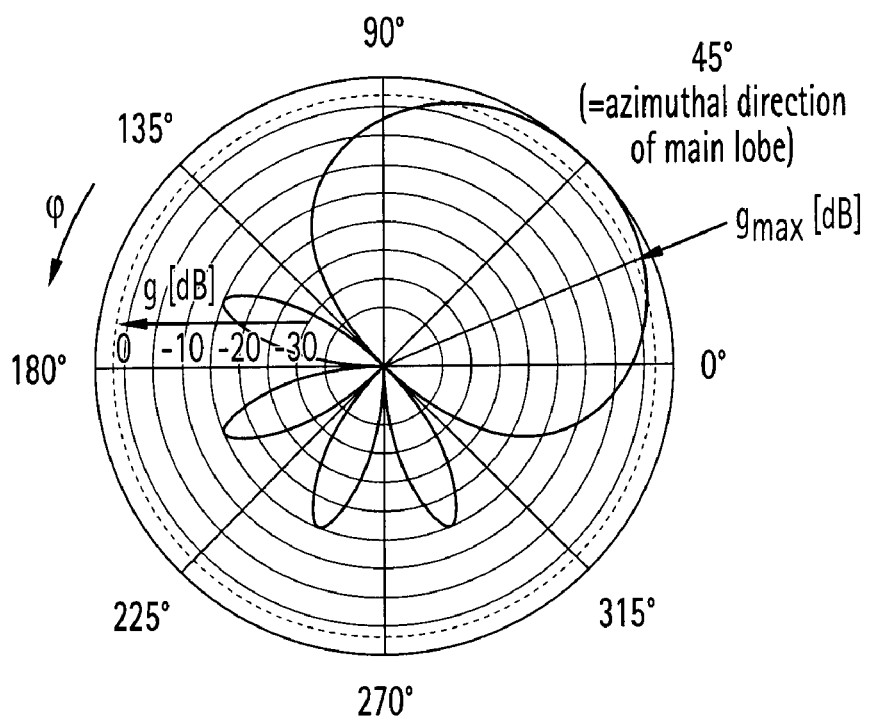
FIG. 6 shows an example of an azimuthal radiation pattern having a main lobe at azimuthal direction $\phi=\pi/4$ rad for a fourth fixed beam antenna of said transmitter- or receiver-resident antenna array consisting of $N_A=4$ fixed beam antennas.
Figure 7:
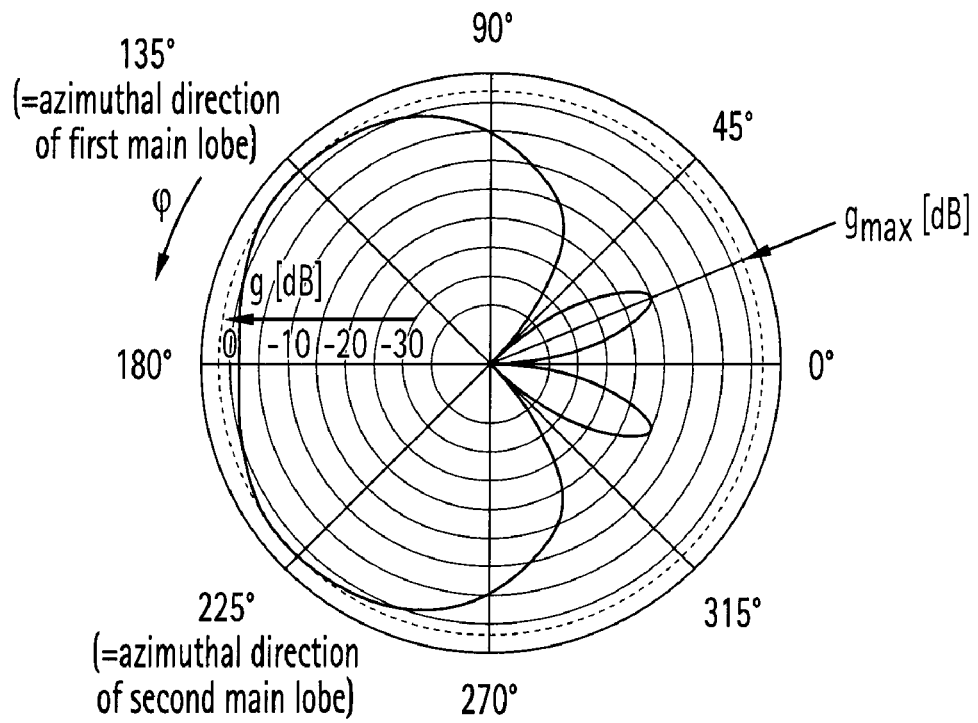
FIG. 7 shows an example of a combined azimuthal radiation pattern which can be obtained when combining the azimuthal radiation patterns of the second and the third fixed beam antenna as depicted in FIG. 4 or 5, respectively.
Figure 8:
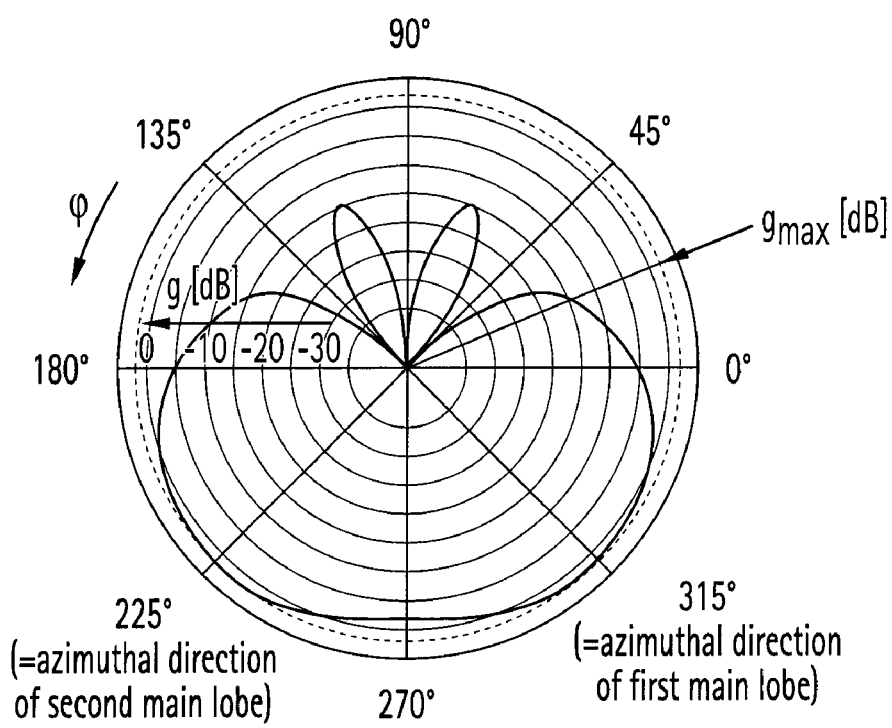
FIG. 8 shows a further example of a combined azimuthal radiation pattern which can be obtained when combining the azimuthal radiation patterns of the first and the second fixed beam antenna as depicted in FIG. 3 or 4, respectively.
Figure 9:
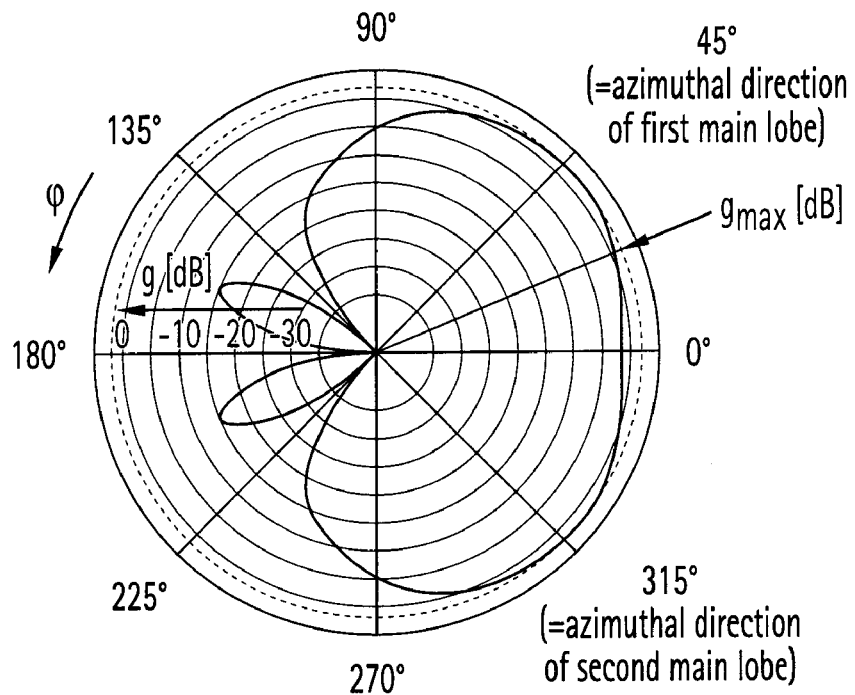
FIG. 9 shows a further example of a combined azimuthal radiation pattern which can be obtained when combining the azimuthal radiation patterns of the first and the fourth second fixed beam antenna as depicted in FIG. 3 or 6, respectively.
Figure 10:
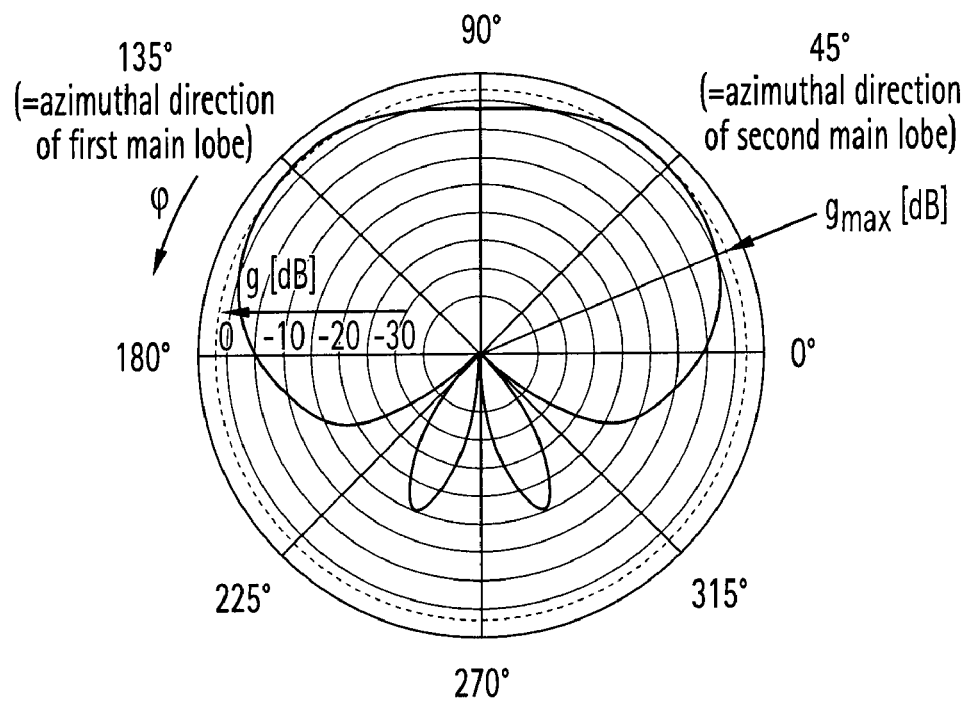
FIG. 10 shows a further example of a combined azimuthal radiation pattern which can be obtained when combining the azimuthal radiation patterns of the third and fourth fixed beam antenna as depicted in FIG. 5 or 6, respectively.
Figure 11:
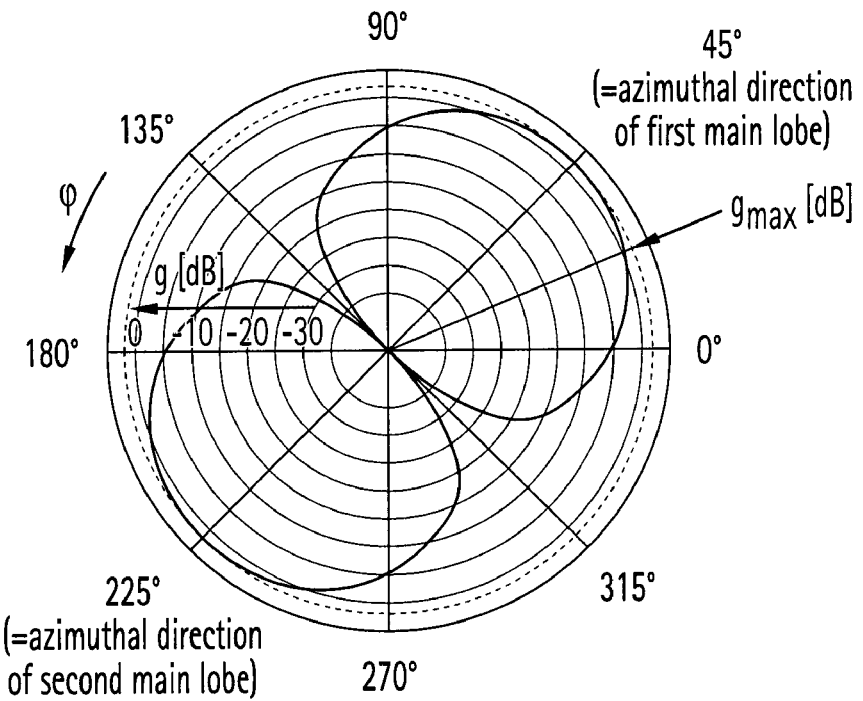
FIG. 11 shows a further example of a combined azimuthal radiation pattern which can be obtained when combining the azimuthal radiation patterns of the second and fourth fixed beam antenna as depicted in FIG. 4 or 6, respectively.
Figure 12:
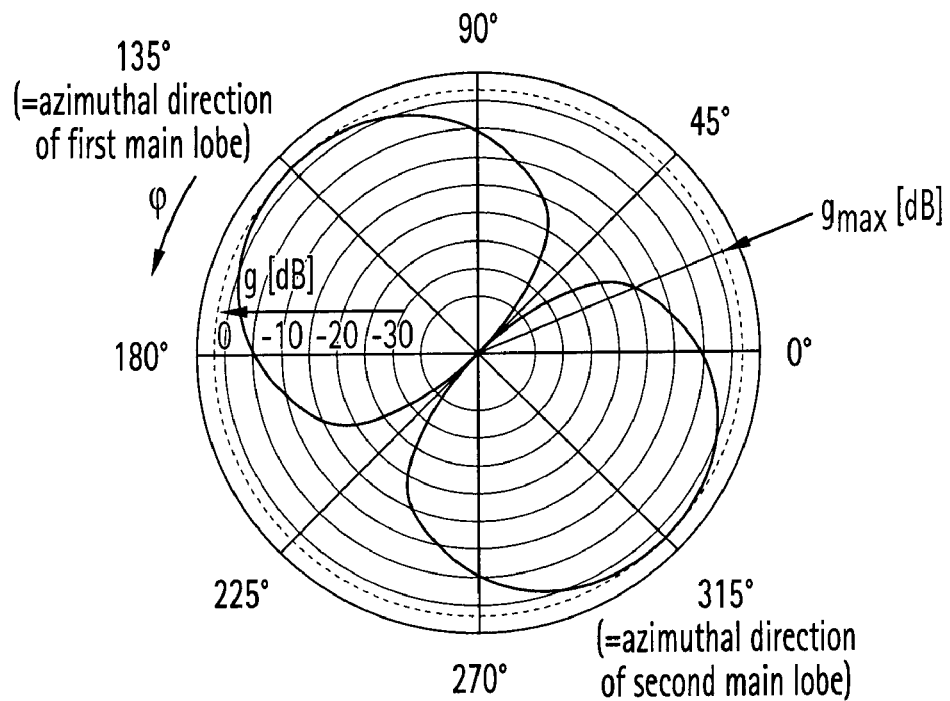
FIG. 12 shows a further example of a combined azimuthal radiation pattern which can be obtained when combining the azimuthal radiation patterns of the first and the third fixed beam antenna as depicted in FIG. 3 or 5, respectively.
Figure 13:
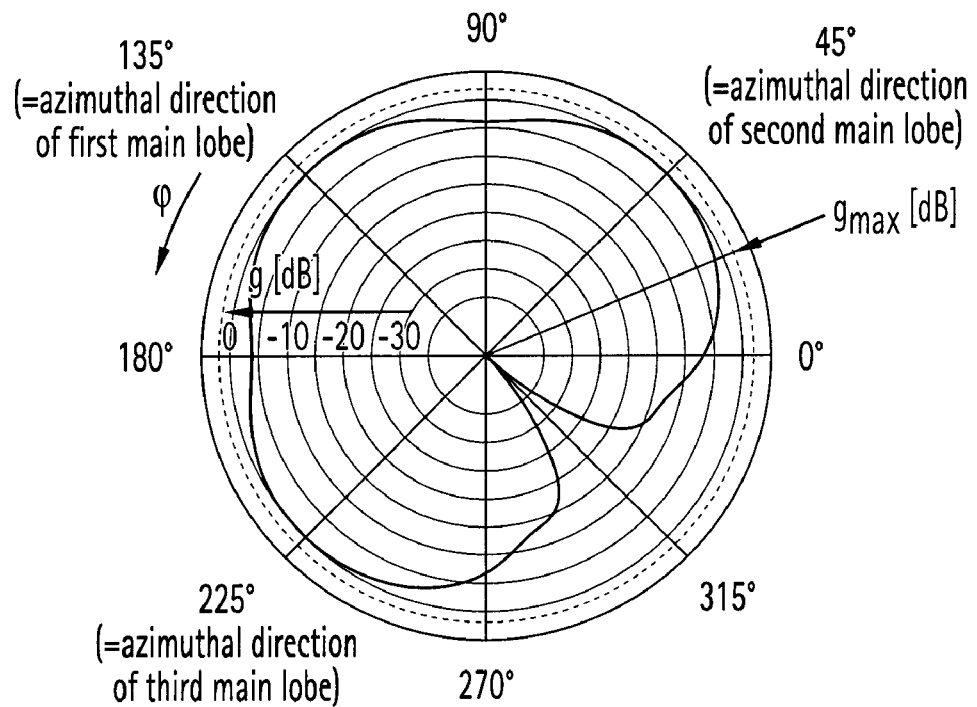
FIG. 13 shows a further example of a combined azimuthal radiation pattern which can be obtained when combining the azimuthal radiation patterns of the second, third and fourth fixed beam antenna as depicted in FIG. 4, 5 or 6, respectively.
Figure 14:
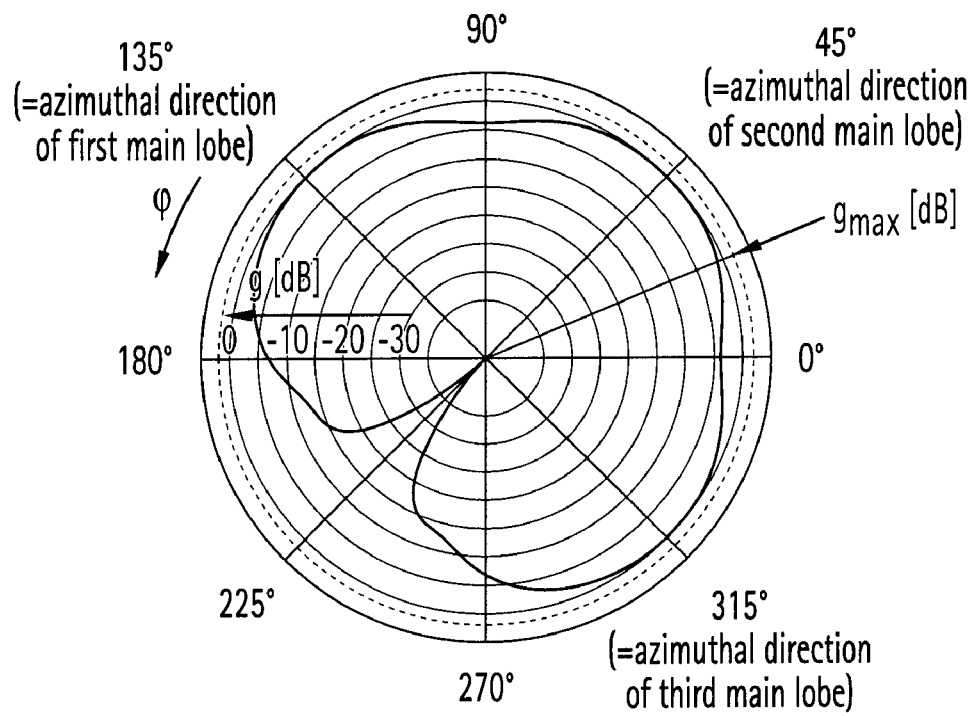
FIG. 14 shows a further example of a combined azimuthal radiation pattern which can be obtained when combining the azimuthal radiation patterns of the first, third and fourth fixed beam antenna as depicted in FIG. 3, 5 or 6, respectively.
Figure 15:
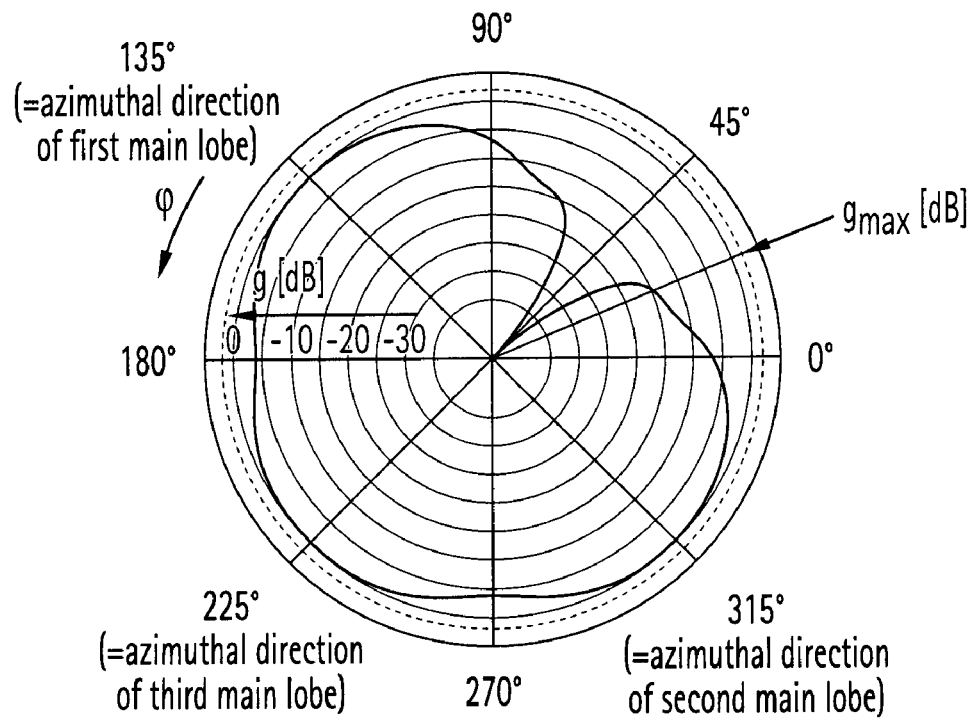
FIG. 15 shows a further example of a combined azimuthal radiation pattern which can be obtained when combining the azimuthal radiation patterns of the first, second and third fixed beam antenna as depicted in FIG. 3, 4 or 5, respectively.
Figure 16:
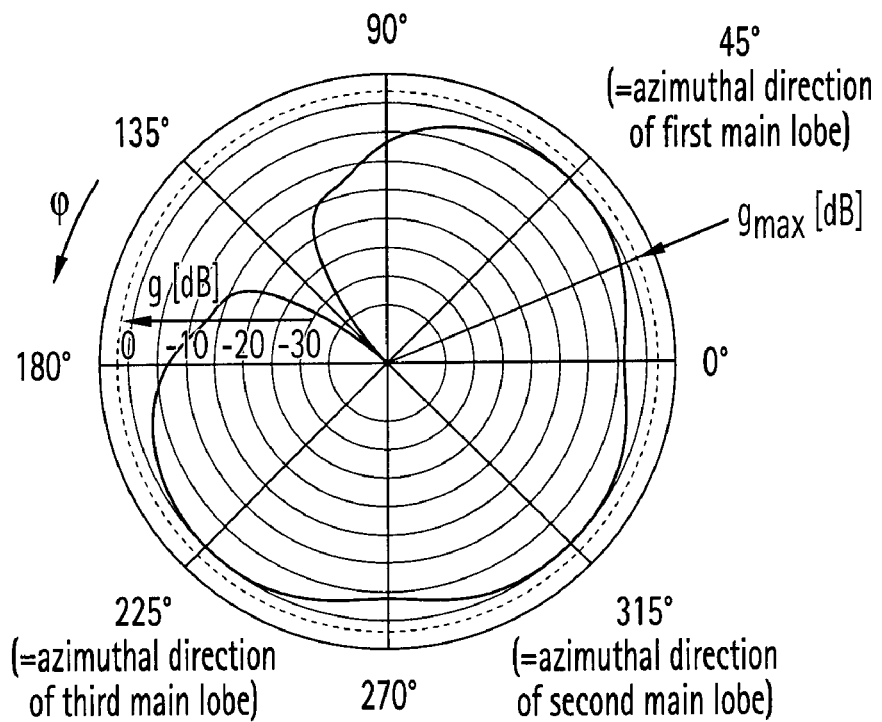
FIG. 16 shows a further example of a combined azimuthal radiation pattern which can be obtained when combining the azimuthal radiation patterns of the first, second and fourth fixed beam antenna as depicted in FIG. 3, 4 or 6, respectively.

FIG. 2 shows a more detailed view of spatial diversity receiver 120 from the OFDM-based 2×2 MIMO spatial multiplexing system depicted in FIG. 1, wherein an antenna array consisting of $N_A$=4 fixed beam antennas 121a or 121b is applied in each receiver branch. Analogously, an antenna array consisting of $N_A$=4 fixed beam antennas may also be used in each transmitter branch of spatial diversity transmitter 110. These $N_A$ fixed beam antennas have different radiation patterns and it shall be assumed that said antennas altogether cover all possible angular directions $\phi[rad]\epsilon[0, 2\pi[$ and $\theta[rad] \epsilon[0, 2\pi[$ in the azimuth plane or elevation plane, respectively, from/to which an RF signal is most likely to be received (or transmitted, respectively). RF signals transmitted by these $N_A$ fixed beam antennas can be combined in $2^{N_A}$ possible ways such that $2^{N_A}$ distinct radiation patterns can be obtained for each receiver branch and/or transmitter branch. For each receiver branch (and/or for each transmitter branch, respectively) a specific combination of beams having a resulting beam center and resulting beam width can be selected from said $2^{N_A}$ combinations, thus yielding optimum BER performance.

As depicted in FIG. 2, $N_A$ fixed beam antennas 121a or 121b for generating distinct antenna radiation patterns representing different antenna beams with up to four main lobes radiating in four preferred azimuthal directions are connected to each receiver branch via an RF combining/switching network 121a' or 121b', respectively, the latter being applied for selectively combining fixed beam antennas 121a (or 121b, respectively) according to decisions made by a beam combination selection algorithm. The selection of a specific combination of fixed beam antennas 121a+b is based on estimated values of the channel impulse responses $h_l(\tau_l, t)$ for said signal propagation paths $P_l$ as provided by a channel estimator 128. These estimates are fed to an antenna beam selection control means 129 which is adapted for controlling at least one of said antenna switching and/or combining means 121a'+b' in order to select a specific combination of fixed beam antennas 121a+b for each antenna array.

Example radiation patterns for each of these fixed beam antennas are shown in FIGS. 3, 4, 5, and 6, respectively. These radiation patterns show the antenna gain g for different azimuthal angles $\phi$ (in rad). The outermost circle corresponds to an antenna gain of 5 dB compared to a reference isotropic antenna. Concentric circles having smaller radii than the outermost circle correspond to antenna gains decremented by equal-sized steps of 5 dB. Such radiation patterns can be typically be achieved when using a patch antenna with two elements. From FIGS. 3 to 6 it can be taken that each antenna radiation pattern comprises a single main lobe in the azimuth plane which is steered to azimuthal directions $\phi_{kml1}[rad]\epsilon\{\pi/4+k_{ml}\cdot\pi/2|k_{ml}\epsilon\{0, 1, 2, 3\}\}$.

Figure 17:
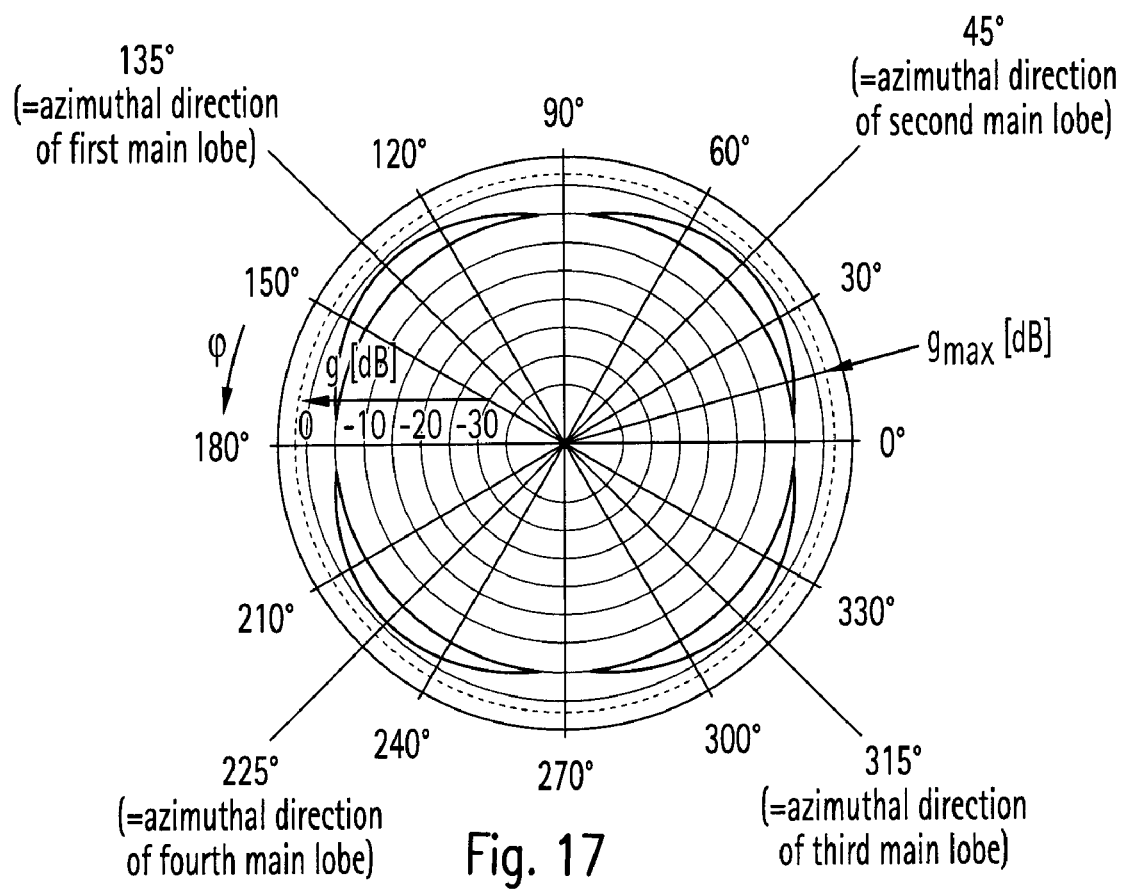
FIG. 17 shows a further example of a combined azimuthal radiation pattern which can be obtained when combining the azimuthal radiation patterns of the first, second, third and fourth fixed beam antenna as depicted in FIG. 3, 4, 5 or 6, respectively.

Antenna radiation patterns which are obtained by combining distinct pairs of antenna radiation patterns as shown in FIGS. 3 to 6 (altogether, $N_A!/[(N_A-2)!\cdot 2!]=6$ combinations are possible for $N_A$=4) are depicted in FIGS. 7 to 12. From FIGS. 7 to 12 it can be taken that each antenna radiation pattern comprises two main lobes in the azimuth plane steered to azimuthal directions $\phi_{kml1}, \phi_{kml2}[rad]\epsilon\{\pi/4+k_{ml}\cdot\pi/2|k_{ml}\epsilon\{0, 1, 2, 3\}\}$. Furthermore, antenna radiation patterns which can be obtained by combining distinct triples of antenna radiation patterns as shown in FIGS. 3 to 6 (altogether, $N_A!/[(N_A-3)!\cdot 3!]=4$ combinations are possible for $N_A$=4) are depicted in FIGS. 13 to 16. Each resulting antenna radiation pattern thus comprises three main lobes in the azimuth plane steered to azimuthal directions $\phi_{kml1}, \phi_{kml2}, \phi_{kml3}[rad]\epsilon\{\pi/4+k_{ml}\cdot\pi/2|k_{ml}\epsilon\{0, 1, 2, 3\}\}$. The radiation pattern which is obtained by combining all four beams is shown in FIG. 17, thus yielding four main lobes in the azimuth plane steered to azimuthal directions $\phi_{kml1}, \phi_{kml2}, \phi_{kml3}, \phi_{kml4}[rad]\epsilon\{\pi/4+k_{ml}\cdot\pi/2|k_{ml}\epsilon\{0, 1, 2, 3\}\}$. Altogether, for this example with $N_A$=4 beams $$N_C := \sum_{k_c=1}^{N_A}\binom{N_A}{k_c} = \sum_{k_c=1}^{N_A}\frac{N_A!}{(N_A-k_c)!\cdot k_c!} \quad (6)$$

$$= \sum_{k_c=1}^{N_A}\frac{1}{k_c!}\cdot\prod_{n_c=N_A-k_c+1}^{N_A}n_c = 2^{N_A} - 1 = 15$$

different antenna radiation patterns corresponding to 15 different combinations are shown in FIGS. 3 to 17. A 16-th radiation pattern (not shown) which is obtained when starting summation of the binomial coefficients in equation (6) with summation index $k_c=0$ corresponds to the (purely hypothetical) case that all the antenna beams are turned off.

One of the unique features of this invention is the capability to control the beam width and the beam center of said fixed beam antennas independently by selecting a certain combination from the $2^{N_A}-1$ combinations. Conventional beam steering schemes for MIMO wireless communication systems according to the prior art as cited above have only the capability to control the beam center, but the beam width is always fixed. The capability to control both the beam width and the beam center of fixed beam antennas, which shall be explained in the following sections, is particularly advantageous for wireless MIMO spatial multiplexing systems.

Figure 18:
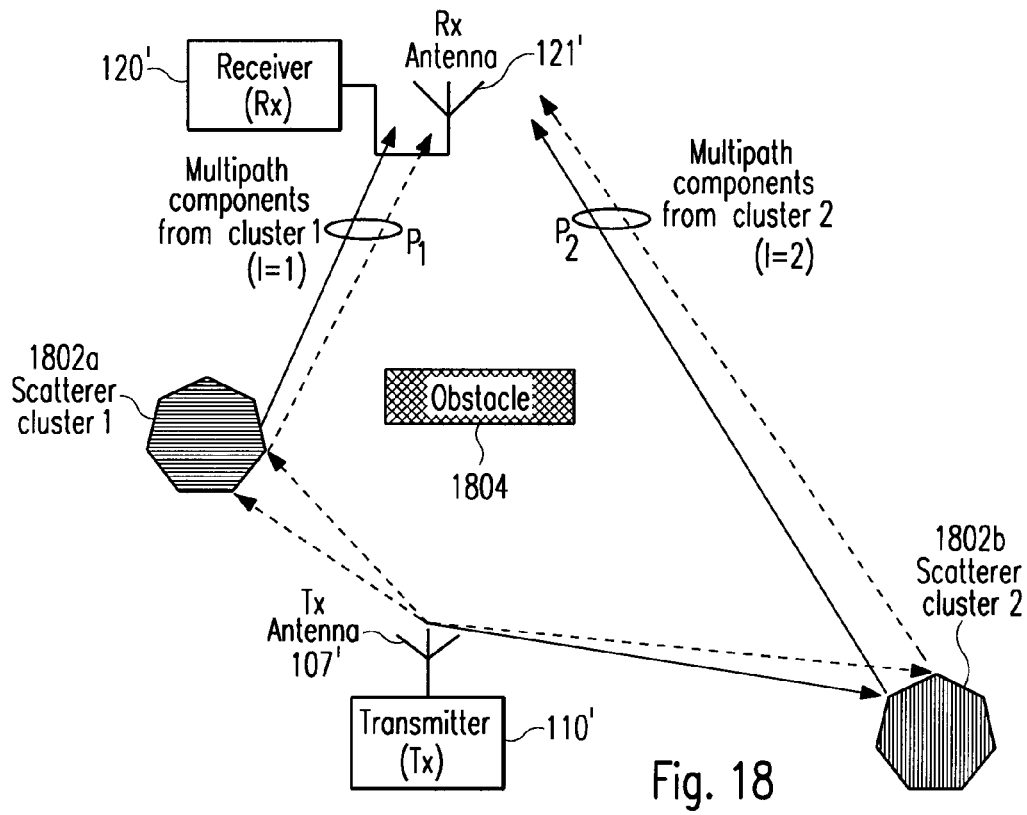
FIG. 18 shows a wireless communication scenario for a multipath fading channel having no direct line-of-sight (LOS) signal propagation path.
Figure 19:
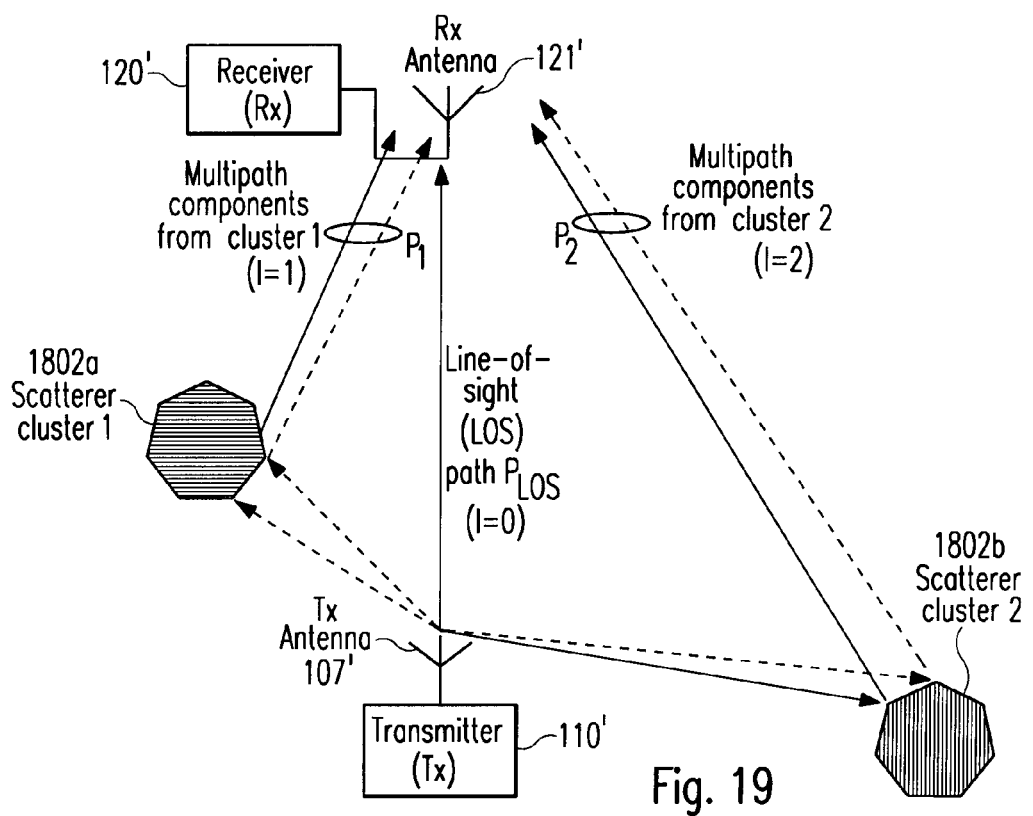
FIG. 19 shows a wireless communication scenario for a multipath fading channel having a direct line-of-sight (LOS) signal propagation path.
Figure 20A:
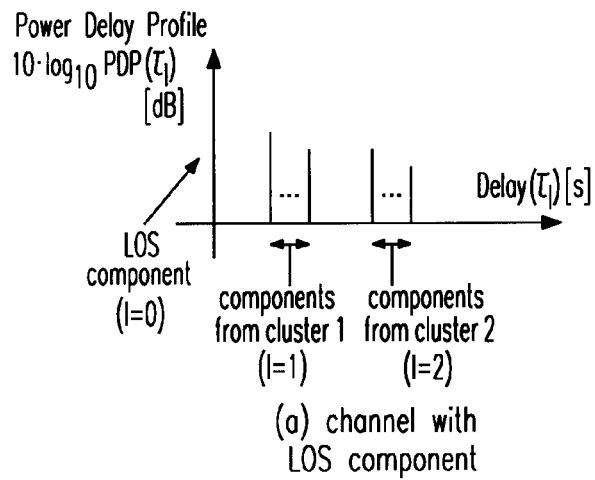
FIG. 20 shows the power delay profiles for the multipath fading channels shown in FIGS. 18 and 19.
Figure 20B:
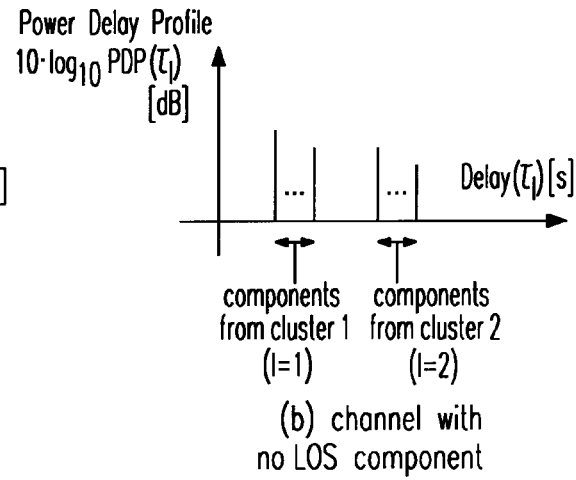

FIG. 18 and FIG. 19 show two typical wireless communication scenarios for a wireless communication system comprising a transmitter 110' having an omni-directional transmit (Tx) antenna 107' and a receiver 120' having an omni-directional receive (Rx) antenna 121'. Both figures show a number of wireless signal propagation paths $P_{LOS}$, $P_1$ and $P_2$ between the spatial diversity transmitter 110' and the spatial diversity receiver 120'. In the wireless communication scenario depicted in FIG. 18 an obstacle 1804 is placed between the spatial diversity transmitter 110' and the receiver 120', and hence there is no direct line-of-sight path $P_{LOS}$ for radio waves sent from transmitter 110' to the receiver 120'. In contrast thereto, in the wireless communication scenario depicted in FIG. 19 there is no obstacle such that a direct line-of-sight path $P_{LOS}$ exists. Both figures show two heptagonal objects 1802a+b representing two different "scattering clusters" which may cause radio waves sent from the transmitter 110' to the spatial diversity receiver 120' to be scattered in multiple directions and therefore received by reflection. Owing to the fact that these objects have multiple edges, there are various ways of a reflected signal for arriving at the spatial diversity receiver. For illustrative purposes only two propagation rays of an electromagnetic wave are shown for each cluster of propagation rays scattered by objects 1802a and 1802b, respectively, wherein, for the sake of simplicity, said ray clusters are referred to as signal propagation paths $P_1$ and $P_2$, respectively. A typical power delay profile for the wireless communication scenarios as depicted in FIG. 19 and FIG. 18 are shown in FIGS. 20 (a) and 20 (b), respectively.

Since each cluster reflects a number of propagation rays, each ray cluster arriving at the receive antenna 120' can be characterized by having a mean azimuthal "angle of arrival" (AoA), in the following referred to as $\bar{\phi}=E\{\phi\}$, and the distribution of the arrival angles around this mean azimuthal AoA can be characterized by an angular spread (AS) which is referred to as $\sigma_\phi=(E\{\phi^2\}-E^2\{\phi\})^{1/2}$. Each receive antenna receives an RF signal that can be represented by a superposition of scattered ray clusters (in FIGS. 18 and 19 two ray clusters are depicted representing a bundle of scattered propagation rays received via signal propagation paths $P_1$ and $P_2$, respectively) which are superimposed by an additive white Gaussian noise (AWGN), and the probability density function of receive power $P_r$ over azimuthal angle $\phi$ (not shown) can be described by a power azimuth spectrum (PAS) that may e.g. be represented by a modified Gaussian or Laplacian probability density function.

Similarly, RF signals transmitted from a transmit antenna of spatial diversity transmitter 110' can be characterized by their mean angle of departure (AoD) and their Angular Spread (AS). The probability density function of transmit power $P_s$ over the azimuthal angle $\phi$ (not shown) can also be described by a power azimuth spectrum PAS ($\phi$) which may e.g. be represented by a modified Gaussian or Laplacian probability density function, $f_g(\phi)$ or $f_l(\phi)$, respectively.

Figure 21:
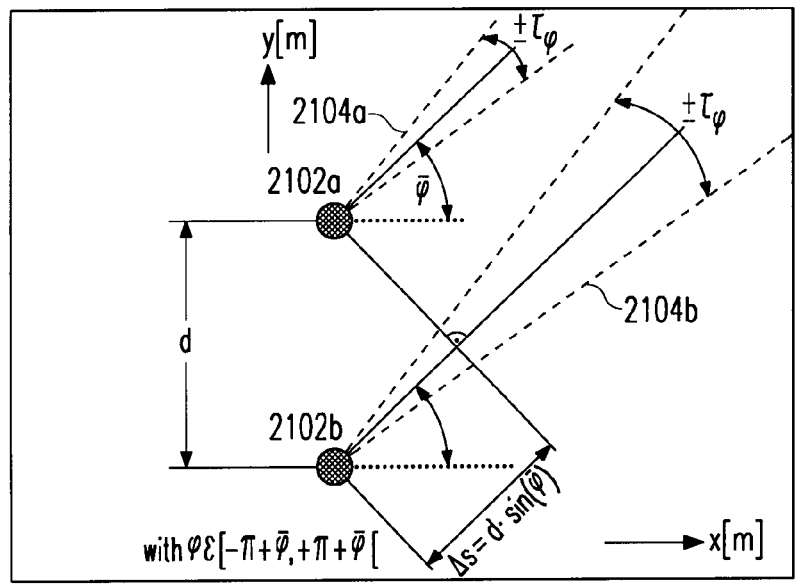
FIG. 21 shows the path difference Δs between two RF signals received by two omni-directional antennas spaced by distance d.

Up to this point, typical multipath communication scenarios for wireless communication systems with a single omni-directional antenna 107' at a transmitter side 110' and a single omni-directional antenna 121' at a receiver side 120', in the relevant technical literature also referred to as Single-Input Single-Output (SISO) wireless communication systems, have been discussed. However, as stated previously, a typical MIMO wireless communication system uses $N \geq 2$ omni-directional transmit antennas on a transmitter side and $M \geq 2$ omni-directional receive antennas on a receiver side. Due to the proximity of the antenna elements of the antenna arrays on receiver side and/or on the transmitter side, respectively, the elements of the channel transfer matrix $H_k(f, t_0)$ (see equations (3b), (3c)) become correlated. The mechanism of correlation at the receiver is depicted in FIG. 21, where two omni-directional receive antennas 2102a+b depicted as black dots are physically separated by distance d (in m). Thereby, lower antenna 2102b receives an RF signal from a cluster 2104b having a power angular spread PAS ($\phi$) represented e.g. by a Gaussian probability density function $f_g(\phi)$. Since both antennas are omni-directional antennas, the upper antenna 2102a receives the same RF signal with a path difference $\Delta s(\phi)$. A similar mechanism of correlation exists at the transmitter.

In order to describe the correlation between the two time-domain RF signals $r_{l1}(\tau_{l1}, t, \phi_{l1})$ and $r_{l2}(\tau_{l2}, t, \phi_{l2})$ received via different signal propagation paths $P_{l1}$ and $P_{l2}$ at the receiver in the wireless communication scenario of a typical wireless MIMO spatial multiplexing system with an antenna array consisting of N transmit antennas on a transmitter side and a further antenna array consisting of M receive antennas on a receiver side, the normalized time-variant spatial correlation coefficient $\rho_{r_{l1}r_{l2}}(t)$ is often used, which is given by $$\rho_{r_{l1}r_{l2}}(t) = \text{Re}\{\rho_{r_{l1}r_{l2}}(t)\} + j \cdot \text{Im}\{\rho_{r_{l1}r_{l2}}(t)\} \quad (7a)$$

$$= \frac{1}{\sqrt{P_{r_{l1}} \cdot P_{r_{l2}}}} \cdot \int_{\varphi_0-\pi}^{\varphi_0+\pi} r_{l1}(\tau_{l1}, t, \varphi) \cdot r_{l2}^*(\tau_{l2}, t, \varphi) \cdot f_g(\varphi) d\varphi$$

$$= \int_{\varphi_0-\pi}^{\varphi_0+\pi} e^{j \cdot z \cdot (m_1-m_2) \cdot \sin\varphi} \cdot f_g(\varphi) d\varphi$$

(with $m_1, m_2 \in \{1, 2, \dots, M \mid m_1 \neq m_2\}$)

with $$\text{Re}\{\rho_{r_{l1}r_{l2}}(t)\} = \int_{\varphi_0-\pi}^{\varphi_0+\pi} \cos[z \cdot (m_1-m_2) \cdot \sin\varphi] \cdot f_g(\varphi) d\varphi \quad (7b)$$

$$= J_0[z \cdot (m_1-m_2)] + 2 \cdot \sum_{n=1}^{\infty} J_{2n}[z \cdot (m_1-m_2)] \cdot$$

$$\cos(2n \cdot \varphi_0) \cdot e^{-2n^2 \cdot \sigma_\varphi^2} \cdot \text{Re}\left\{\text{erf}\left(\frac{\pi + j \cdot 2n \cdot \sigma_\varphi^2}{\sqrt{2} \sigma_\varphi}\right)\right\}$$

and

-continued $$\text{Im}\{\rho_{r_{f1}r_{f2}}(t)\} = \int_{\varphi_0-\pi}^{\varphi_0+\pi} \sin[z \cdot (m_1 - m_2) \cdot \sin\varphi] \cdot f_g(\varphi) d\varphi \quad (7c)$$

$$= 2 \cdot \sum_{k=1}^{\infty} J_{2n+1}[z \cdot (m_1 - m_2)] \cdot \sin[(2n+1) \cdot \varphi_0] \cdot$$

$$e^{-\frac{(2n+1)^2}{2} \cdot \sigma_\varphi^2} \cdot \text{Re}\left\{\text{erf}\left(\frac{\pi + j \cdot (2n+1) \cdot \sigma_\varphi^2}{\sqrt{2} \, \sigma_\varphi}\right)\right\},$$

wherein $P_{r_{f1}} = \sigma_{r_{f1}}^2(t)$ and $P_{r_{f2}} = \sigma_{r_{f2}}^2(t)$ denote the average powers of F signals $r_{f1}(\tau_{f1}, t, \phi_{f1})$ and $r_{f2}(\tau_{f2}, t, \phi_{f2})$ received via signal propagation paths $P_{f1}$ or $P_{f2}$, respectively, $J_n(\cdot)$ is the Bessel function of the first kind of order n and r (–) denotes the gamma function.

A similar description can be made for the transmitter.

Due to these correlation mechanisms at the receiver and the transmitter the elements of the channel transfer matrix $H_k$ (see equations (3b), (3c)) for the OFDM MIMO system become correlated. This correlation between the elements can be described by expressing the channel transfer matrix as follows:

$$H_k = R_{rx,k}^{1/2} H_{iid} R_{tx,k}^{1/2}$$

Where $R_{rx,k}$ and $R_{tx,k}$ are the receiver and transmitter correlation matrices respectively and $H_{iid}$ is a matrix of independent zero mean, unit variance, complex Gaussian random variables. For an example MIMO system with 2 transmitter antennas and 2 receiver antennas, the receiver and transmitter correlation matrices can be expressed respectively as follows:

$$R_{rx,k} = \begin{bmatrix} 1 & \rho_{rx12} \\ \rho_{rx21} & 1 \end{bmatrix}$$

$$R_{tx,k} = \begin{bmatrix} 1 & \rho_{tx12} \\ \rho_{tx21} & 1 \end{bmatrix}$$

Where the elements represent the correlation between the receive antennas or transmit antennas.

According to the present invention, the BER performance of the wireless MIMO spatial multiplexing system is enhanced by selecting a combination of beam antennas on the transmitter side and/or on the receiver side so as to maximise the average signal-to-interference-plus-noise ratios $\bar{\gamma}_l(t)$ (SINRs) of the RF signals $r_l(\tau_l, t, \phi_l)$ received by the receiver-resident antenna arrays via different signal propagation paths $P_l$ and, further, to minimise the correlation coefficients of the channel transfer matrix.

FIGS. 22 to 25 show different wireless communication scenarios in a 2×2 MIMO spatial multiplexing system wherein an antenna beam selection procedure according to the present invention is described. Thereby, four example scenarios are shown with two omni-directional transmit antennas 107a+b of a first antenna array on a transmitter side 110 and two receive antennas 121a+b of a second antenna array on a receiver side 120, said receive antennas being realized as fixed beam antennas, wherein said transmit antennas 107a+b and said receive antennas 121a+b are using line-of-sight (LOS) signal propagation paths ($P_{1,0}$ and $P_{2,0}$) or non-line-of-sight (NLOS) signal propagation paths ($P_{1,1}$ and $P_{1,2}$ or $P_{2,1}$ and $P_{2,2}$) from the same clusters, respectively.

Figure 22:
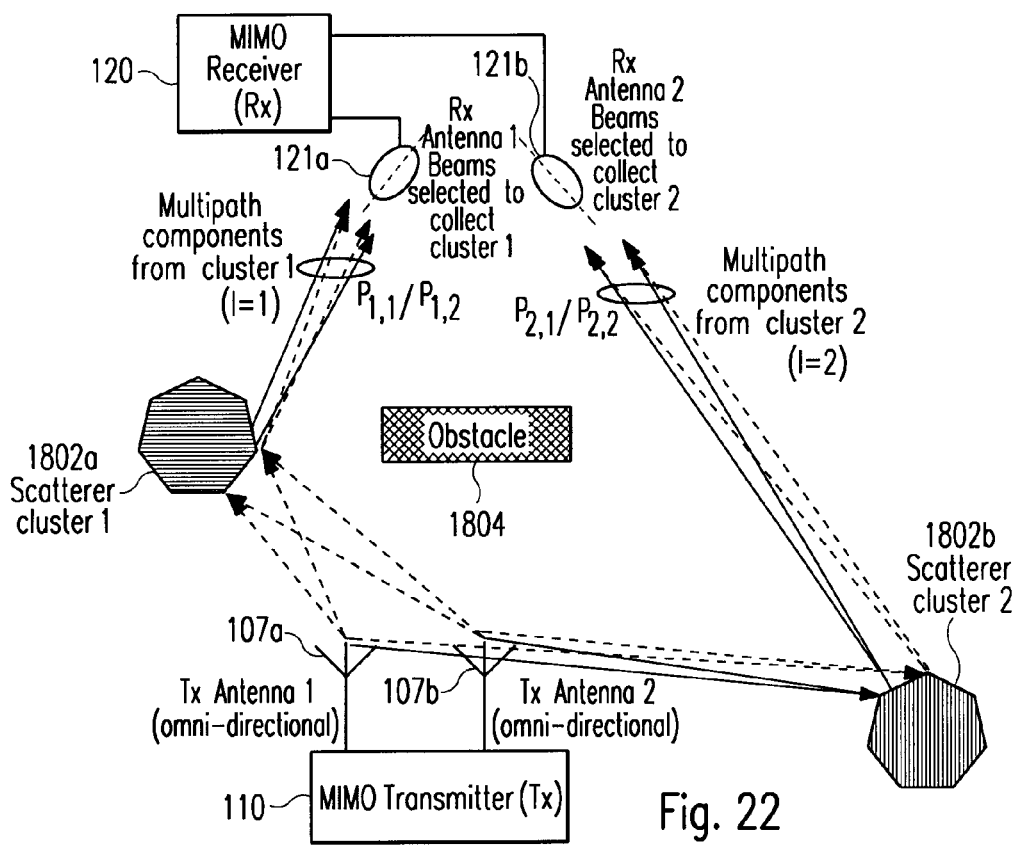
FIG. 22 shows a first wireless communication scenario in a 2×2 MIMO spatial multiplexing system according to the present invention with two scattering objects, an obstacle preventing direct line of sight communication between a spatial diversity transmitter and a spatial diversity receiver as well as different NLOS signal propagation paths.

FIG. 22 shows an example scenario with two heptagonal scattering objects 1802a+b and one rectangular obstacle 1804 which prevents direct line of sight communication between a spatial diversity transmitter 110 and a spatial diversity receiver 120 in a 2×2 MIMO spatial multiplexing system with different NLOS signal propagation paths $P_{1,1}$, $P_{1,2}$, $P_{2,1}$ and $P_{2,2}$. In this example scenario, a first receiver branch selects a combination of antenna beams having a center angle close to the angle of arrival $\phi_1$ of a first cluster consisting of signal propagation paths $P_{1,1}$ and $P_{1,2}$ and a second receiver branch selects a combination of antenna beams having a center angle close to the angle of arrival $\phi_2$ of a second cluster consisting of signal propagation paths $P_{2,1}$ and $P_{2,2}$.

It shall be assumed that the multipath components of these two clusters are uncorrelated with respect to each other. Since receive antenna 121a has a high attenuation to the reception of RF signals received via signal propagation paths of said second cluster (the main beam of receive antenna 121a is pointed to the direction of RF signals received via signal propagation paths $P_{1,1}$ and $P_{1,2}$ of said first cluster) and receive antenna 121b has a high attenuation to the reception of RF signals received via signal propagation paths of said first cluster (the main beam of receive antenna 121b is pointed to the direction of RF signals received via signal propagation paths $P_{2,1}$ and $P_{2,2}$ of said second cluster), the correlation between the two RF signals received by receive antennas 121a+b is minimized. In this way, criterion 1 for efficient MIMO operation as discussed above (which can be interpreted as minimization of correlation coefficient $\rho_{r_{f1}r_{f2}}(t)$ for RF signals $r_{f1}(\tau_{f1}, t, \phi_{f1})$ and $r_{f2}(\tau_{f2}, t, \phi_{f2})$ received via signal propagation paths $P_{f1}$ and $P_{f2}$ with $l_1:=1$ and $l_2:=2$) is satisfied.

One of the advantages of the present invention is that due to the fact that the center angle and the beam width of receive antennas 121a+b can be controlled by selecting a suitable one from the $N_C = 2^{N_A}-1$ possible antenna beam combinations, the receive antenna characteristics can be well matched to both the azimuthal angle of arrival (AoA) and the angular spread (AS) (or angular width) of the received clusters, and thereby BER performance can be optimized.

Figure 23:
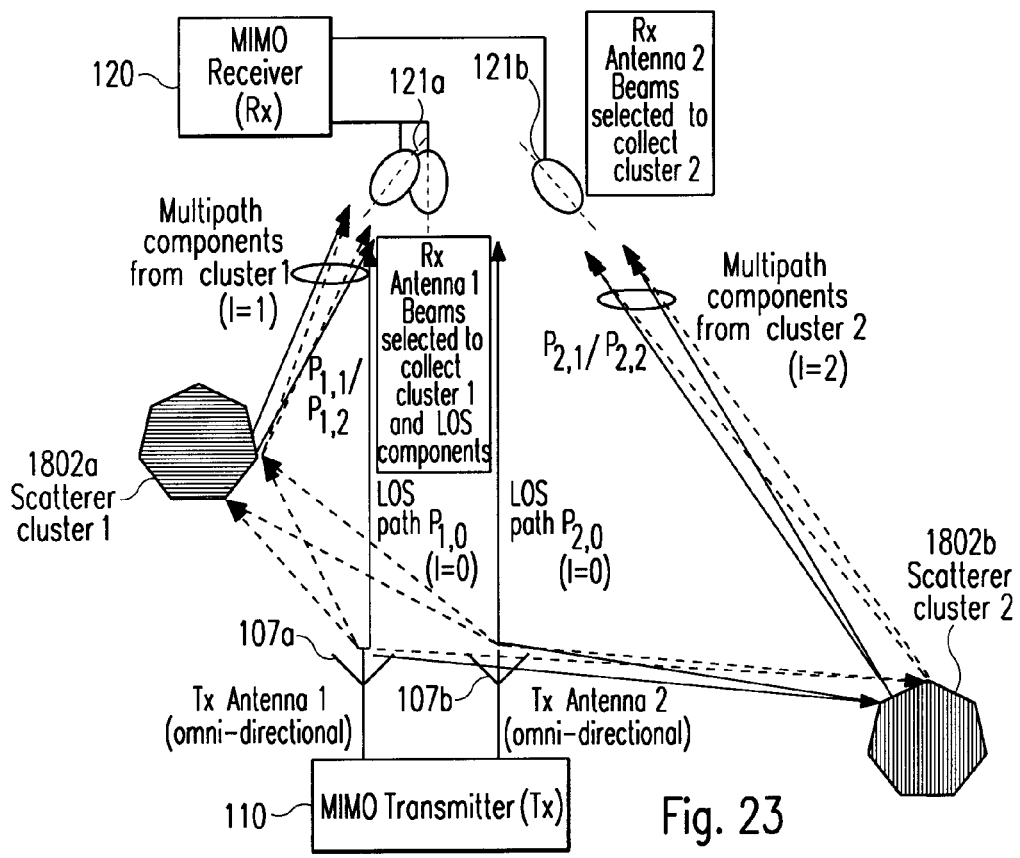
FIG. 23 shows a further wireless communication scenario in the 2×2 MIMO spatial multiplexing system according to the present invention with two scattering objects, distinct NLOS signal propagation paths and two direct LOS signal propagation paths.

FIG. 23 shows an example scenario in a 2×2 MIMO spatial multiplexing system with two heptagonal scattering objects 1802a+b, distinct NLOS signal propagation paths $P_{1,1}$, $P_{1,2}$, $P_{2,1}$ and $P_{2,2}$ and two direct LOS signal propagation paths $P_{1,0}$ and $P_{2,0}$. In the depicted example scenario, a combination of antenna beams is selected by said first receiver branch so as to detect RF signals received via NLOS signal propagation paths $P_{1,1}$ and $P_{1,2}$ of said first cluster as well as a further RF signal received via direct LOS signal propagation path $P_{1,0}$. A further combination of antenna beams is selected by said second receiver branch in order to detect RF signals received via NLOS signal propagation paths $P_{2,1}$ and $P_{2,2}$ of said second cluster as well as a further F signal received via direct LOS signal propagation path $P_{2,0}$. Again, the above-defined criterion 1 (minimization of correlation coefficient $\rho_{r_{f1}r_{f2}}(t)$ for RF signals $r_{f1}(\tau_{f1}, t, \phi_{f1})$ and $r_{f2}(\tau_{f2}, t, \phi_{f2})$ received via signal propagation paths $P_{f1}$ and $P_{f2}$ with $l_1:=1$ and $l_2:=2$) is satisfied.

Figure 24:
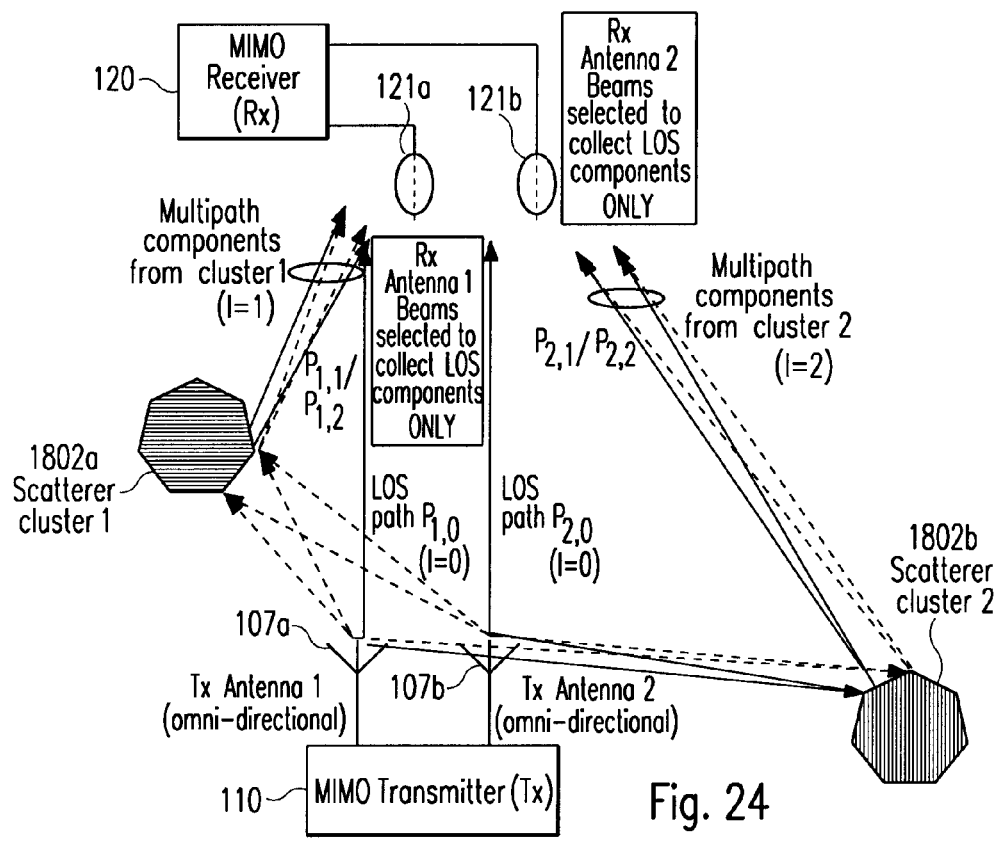
FIG. 24 shows a further wireless communication scenario in the 2×2 MIMO spatial multiplexing system according to the present invention with two scattering objects, distinct NLOS signal propagation paths and two direct LOS signal propagation paths having a relatively high average signal-to-interference-plus-noise ratio.

FIG. 24 shows another example scenario in a 2×2 MIMO spatial multiplexing system with two heptagonal scattering objects 1802a+b, distinct NLOS signal propagation paths $P_{1,1}$, $P_{1,2}$, $P_{2,1}$, $P_{2,1}$ and $P_{2,2}$ and two direct LOS signal propagation paths $P_{1,0}$ and $P_{2,0}$ having a relatively high average signal-to-interference-plus-noise ratio $\bar{\gamma}_0$. In this example scenario, a combination of antenna beams is selected by said first receiver branch so as to detect an RF signal received via direct LOS signal propagation path $P_{1,0}$ only. A further combination of antenna beams is selected by said second receiver branch in order to detect an RF signal received via direct LOS signal propagation path $P_{2,0}$ only. This may provide an enhanced BER performance when average signal-to-interference-plus-noise ratio $\bar{\gamma}_0$ of direct LOS paths $P_{1,0}$ and $P_{2,0}$ is considerably higher than the average signal-to-interference-plus-noise ratios $\bar{\gamma}_1$ and $\bar{\gamma}_2$ of NLOS paths $P_{1,1}$, $P_{1,2}$, $P_{2,1}$ and $P_{2,2}$ from said first and second cluster. In this case, criterion 2 (maximization of the average signal-to-interference-plus-noise ratios $\bar{\gamma}_l$ of the RF signals $r_l(\tau_l, t, \phi_l)$ received via signal propagation paths $P_l$), but the received RF signals are still correlated.

Figure 25:
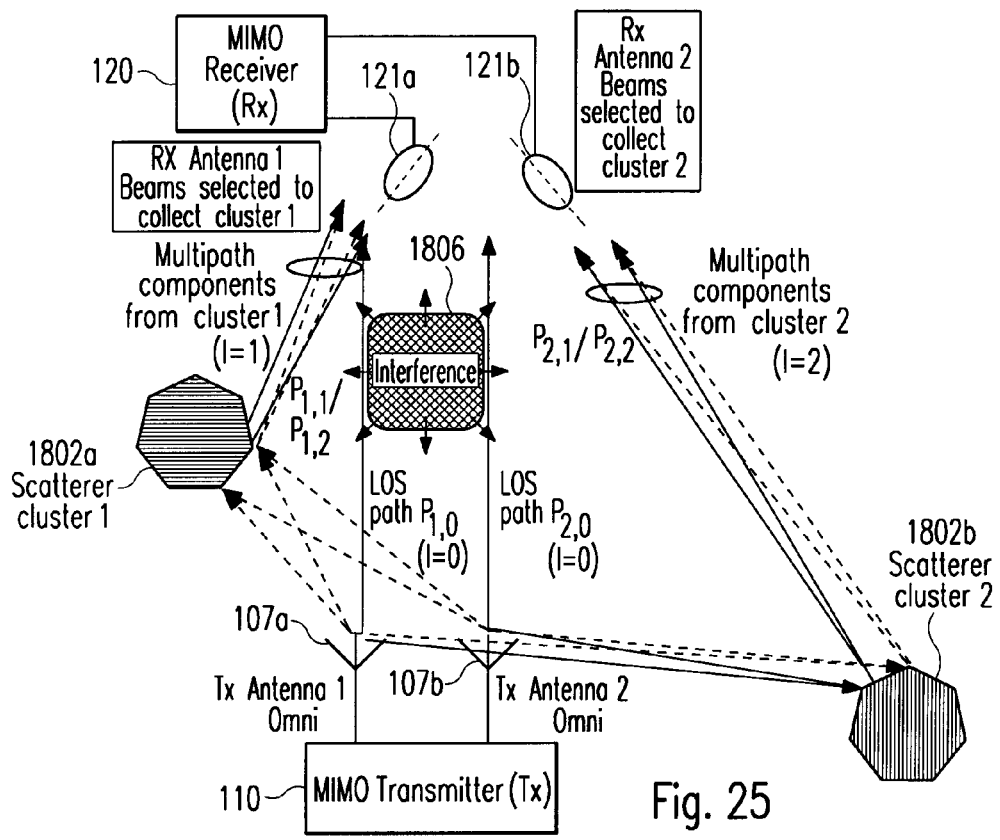
FIG. 25 shows a final wireless communication scenario in a 2×2 MIMO spatial multiplexing system according to the present invention with two scattering objects, NLOS signal propagation paths and two direct LOS signal propagation paths in the presence of an interferer, and In the following, the present invention will be explained in more detail with respect to special embodiments and in relation to the accompanying drawings. The basic principle of the invention will be explained based on a MIMO wireless communication system which uses multi-carrier modulation such as Orthogonal Frequency-Division Multiplexing (OFDM). Of course, the described principle can also be applied to any other not OFDM-based wireless MIMO spatial multiplexing system.

FIG. 25 shows a final example scenario in a 2×2 MIMO spatial multiplexing system with two heptagonal scattering objects 1802a+b, distinct NLOS signal propagation paths $P_{1,1}, P_{1,2}, P_{2,1}$ and $P_{2,2}$ and two direct LOS signal propagation paths $P_{1,0}$ and $P_{2,0}$ in the presence of an interferer 1806. In this example scenario, interferer 1806 has an azimuthal angle of arrival whose direction is approximately identical to the propagation direction of the RF signals received via said LOS signal propagation paths $P_{1,0}$ and $P_{2,0}$. The antenna beams of receive antennas 121a and 121b are therefore directed away from the interfering RF signal and are steered in the direction to RF signals received via signal propagation paths of said first or said second cluster, respectively. In the depicted case, criterion 1 (minimization of correlation coefficient $\rho_{r_{l1}r_{l2}}(t)$ for R signals $r_{l1}(\tau_{l1}, t, \phi_{l1})$ and $r_{l2}(\tau_{l2}, t, \phi_{l2})$ received via signal propagation paths $P_{l1}$ and $P_{l2}$ with $l_1:=1$ and $l_2:=2$) and criterion 2 (maximization of average signal-to-interference-plus-noise ratios $\bar{\gamma}_l$ of the RF signals $r_l(\tau_l, t, \phi_l)$ received via signal propagation paths $P_l$) are both satisfied.

Which antenna combination (and hence antenna beam center and beam width) for each receiver branch is the best for optimum BER performance depends on a number of factors, including the number of clusters, the angular spread, the power distribution of the clusters, the average SINR ratio $\bar{\gamma}_0$ of RF signals which are received via direct LOS paths $P_{1,0}$ and $P_{2,0}$ ("LOS components") compared to average SINR ratios $\bar{\gamma}_l$ of RF signals that are received via NLOS paths $P_{1,1}, P_{1,2}, P_{2,1}$ and $P_{2,2}$ ("multipath cluster components"). It is possible that both criterion 1 and criterion 2 may not be fulfilled completely, but a compromise between them should be made to optimize BER performance of the wireless MIMO spatial multiplexing system.

To control antenna beam selection at the receiver side (and/or at the transmitter side), a beam combination selection algorithm according to the present invention can be executed at the spatial diversity receiver 120 (and/or at the spatial diversity transmitter 110). This beam combination selection algorithm can be implemented in hardware or software and decides which beam combination is best based on channel measurements. From these channel measurements, the correlation coefficient $\rho_{r_{l1}r_{l2}}(t)$ for different beam combinations and the average signal-to-interference-plus-noise ratios $\bar{\gamma}_l$ of the RF signals $r_l(\tau_l, t, \phi_l)$ received via signal propagation paths $P_l$ are estimated.

The main advantageous differences between the proposed wireless MIMO spatial multiplexing system and the proposed antenna beam combination selection algorithm according to the present invention and the prior art can be summarized as follows:

1) Using the proposed beam combination selection algorithm according to the present invention leads to a higher BER performance.
2) The receive antenna elements of the antenna arrays on the receiver side (and or the transmit antenna elements of the antenna arrays on the transmitter side) can be spaced closer together than in a conventional wireless MIMO spatial multiplexing system according to the prior art because the correlation coefficient $\rho_{r_{l1}r_{l2}}(t)$ between RF signals received by said receive antenna elements is reduced. The "antenna footprint", can therefore be potentially reduced.
3) Finally, a simpler equalizer with lower complexity can be used at the receiver side because the correlation between the channel impulse responses $h_l(\tau_l, t)$ of different signal propagation paths $P_l$ between the antenna elements on the transmitter side and the antenna elements on the receiver side is reduced.

In contrast to the above-mentioned articles published by Y. Nakaya et al., the proposed MIMO wireless communication system according to the present invention employs a number of fixed beam antennas for each spatial diversity receiver and/or spatial diversity transmitter component of comprised in the MIMO wireless communication system. Said fixed beam antennas are selectively combined at RF, such that both the center and the width of the resulting beam can be controlled. In this way, BER performance of the MIMO wireless communication system can be optimized in a variety of different channel conditions. The criteria used for selective beam combining are based on receiver measurements of signal power and receiver signal correlation.

From the MIMO wireless communication system as described in Shian's and Ingram's article the proposed idea of the present invention differs in that the spatial distance between the applied antenna elements is kept constant.

In contrast to the system described in Thudor's and Louzir's article, the wireless MIMO spatial multiplexing system described here in this invention uses a set of fixed beam antennas on the transmitter side and/or on the receiver side which are selectively combined so as to reduce the correlation of the channel impulse responses for the respective signal propagation paths between at least two transmit antennas on a transmitter side and/or at least two receive antennas on a receiver side. The system described by Thudor and Louzir only switches the beams, it does not selectively combine them. Furthermore the system described by Thudor and Louzoir does not use MIMO spatial multiplexing.

The invention claimed is:

1. A spatial diversity receiver for wirelessly receiving a modulated RF signal, said spatial diversity receiver comprising:
at least two antenna arrays, wherein each antenna array of the spatial diversity receiver comprises at least two fixed beam antennas with distinct radiation patterns, and combinations of said fixed beam antennas are selectable for wireless receipt of the modulated RF signal; and
an antenna beam selection control unit configured to control at least one antenna switching and/or combining unit in order to select a specific combination of fixed beam antennas from each antenna array, wherein
each fixed beam antenna of said at least two antenna arrays has a distinct radiation pattern with a different beam center and/or beam width in the azimuth and/or elevation plane, and
a superposition of all these radiation patterns covers all possible azimuthal and/or elevational angles of arrival from which an RF signal is likely to be received.

2. The spatial diversity receiver according to claim 1, further comprising:
a channel estimation and/or equalization circuitry configured to compensate for detected multipath fades in a channel amplitude response of at least one wireless signal propagation path between a wireless transmitter and the spatial diversity receiver.

3. The spatial diversity receiver according to claim 1, wherein said receiver is configured to receive said modulated RF signal in a MIMO system.

4. A method for wirelessly transmitting and receiving a modulated RF signal via multiple wireless signal propagation path between a spatial diversity transmitter and a spatial diversity receiver, said spatial diversity transmitter including at least two antennas for wirelessly transmitting said modulated RF signal to the spatial diversity receiver and the spatial diversity receiver including at least two antenna arrays, wherein each antenna array of the spatial diversity receiver comprises a number of fixed beam antennas with distinct radiation patterns, said method comprising:

estimating sample values of the channel impulse responses for each wireless signal propagation path;

selecting, by said spatial diversity receiver, a specific combination of the fixed beam antennas from each antenna array based on the estimated values of the channel impulse responses for said signal propagation paths; and receiving said RF signal by the selected combination of fixed beam antennas, wherein each fixed beam antenna of said at least two antenna arrays has a distinct radiation pattern with a different beam center and/or beam width in the azimuth and/or elevation plane, and a superposition of all these radiation patterns covers all possible azimuthal and/or elevational angles of arrival from which an RF signal is likely to be received.

5. The method according to claim 4, further comprising:

maximizing the average signal-to-interference-plus-noise ratios of RF signals received via each signal propagation path and/or minimizing the correlation coefficient indicating the correlation between RF signals received via different wireless signal propagation paths.

6. The method according to claim 4, wherein said receiver is configured to receive said modulated RF signal in a MIMO system and said transmitter is configured to transmit said modulated RF signal in said MIMO system.

7. A non-transitory computer-readable storage medium having embedded therein instructions, which when executed by a processor, perform the method of claim 4.

* * * * *